United States Patent
Ohmae et al.

(10) Patent No.: US 10,447,528 B2
(45) Date of Patent: Oct. 15, 2019

(54) RADIO COMMUNICATION SYSTEM AND NON-TRANSITORY COMPUTER-READABLE STORAGE MEDIUM

(71) Applicant: OMRON Corporation, Kyoto-shi, Kyoto (JP)

(72) Inventors: Soji Ohmae, Nara (JP); Ryota Yamada, Tokyo (JP); Hajime Umeki, Soraku-gun (JP); Yasushi Kawashima, Kusatsu (JP); Yuki Inoue, Sakai (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/905,866

(22) Filed: Feb. 27, 2018

(65) Prior Publication Data
US 2018/0351789 A1 Dec. 6, 2018

(30) Foreign Application Priority Data
Jun. 1, 2017 (JP) ................................. 2017-109059

(51) Int. Cl.
*H04L 12/24* (2006.01)
*H04B 17/23* (2015.01)
(Continued)

(52) U.S. Cl.
CPC ........... *H04L 41/0677* (2013.01); *H04B 7/14* (2013.01); *H04B 17/23* (2015.01); *H04B 17/26* (2015.01);
(Continued)

(58) Field of Classification Search
CPC ..... H04L 41/0677; H04B 7/14; H04B 17/318; H04B 17/23; H04B 17/26; H04B 17/29;
(Continued)

(56) References Cited

U.S. PATENT DOCUMENTS

2005/0152376 A1* 7/2005 Itoh ........................ H04W 8/005
370/400
2012/0075987 A1 3/2012 Yoneyama et al.
(Continued)

FOREIGN PATENT DOCUMENTS

EP 2814285 A1 12/2014
JP H05-27821 A 2/1993
(Continued)

OTHER PUBLICATIONS

The extended European search report dated Aug. 28, 2018 in a counterpart European Patent application.
Japanese Office Action dated Mar. 13, 2018 in a counterpart Japanese patent application.

*Primary Examiner* — Will W Lin
(74) *Attorney, Agent, or Firm* — Metrolex IP Law Group, PLLC

(57) ABSTRACT

A radio communication system includes: slave devices which repetitively transmit, a plurality of times, a radio signal with a prescribed frequency that includes device identification information during a radio communication with a master device; a master device which generates communication situation information including a reception success rate and received signal strength of a radio signal during each radio communication from each slave device; and a failure factor estimation apparatus which, based on communication situation information with respect to a plurality of radio communications including a radio communication in which a communication failure of the received signal strength is lower than prescribed strength and/or the reception success rate is lower than a prescribed rate has occurred, generates and outputs failure factor presentation information indicating a failure inducer estimated to have induced the communication failure and an estimation result of a position of the failure inducer.

11 Claims, 14 Drawing Sheets

(51) Int. Cl.
*H04B 17/26* (2015.01)
*H04B 17/318* (2015.01)
*H04B 7/14* (2006.01)
*H04W 24/04* (2009.01)
*H04W 84/18* (2009.01)
*H04B 17/17* (2015.01)
*H04B 17/18* (2015.01)
*H04B 17/29* (2015.01)
*H04W 84/20* (2009.01)

(52) U.S. Cl.
CPC ........... *H04B 17/318* (2015.01); *H04B 17/17* (2015.01); *H04B 17/18* (2015.01); *H04B 17/29* (2015.01); *H04W 24/04* (2013.01); *H04W 84/18* (2013.01); *H04W 84/20* (2013.01)

(58) Field of Classification Search
CPC ....... H04B 17/18; H04B 17/17; H04W 84/20; H04W 24/04; H04W 84/18
See application file for complete search history.

(56) References Cited

U.S. PATENT DOCUMENTS

| | | | | |
|---|---|---|---|---|
| 2013/0337748 | A1* | 12/2013 | Reunamaki | H04W 8/005 455/41.2 |
| 2014/0099987 | A1* | 4/2014 | Saito | H04W 4/08 455/519 |

FOREIGN PATENT DOCUMENTS

| | | |
|---|---|---|
| JP | H09-191305 A | 7/1997 |
| JP | 2008-022490 A | 1/2008 |
| JP | 2008-079226 A | 4/2008 |
| JP | 2010-147519 A | 7/2010 |
| JP | 2013-021516 A | 1/2013 |
| JP | 2013-197900 A | 9/2013 |
| JP | 2016-15652 A | 1/2016 |

* cited by examiner

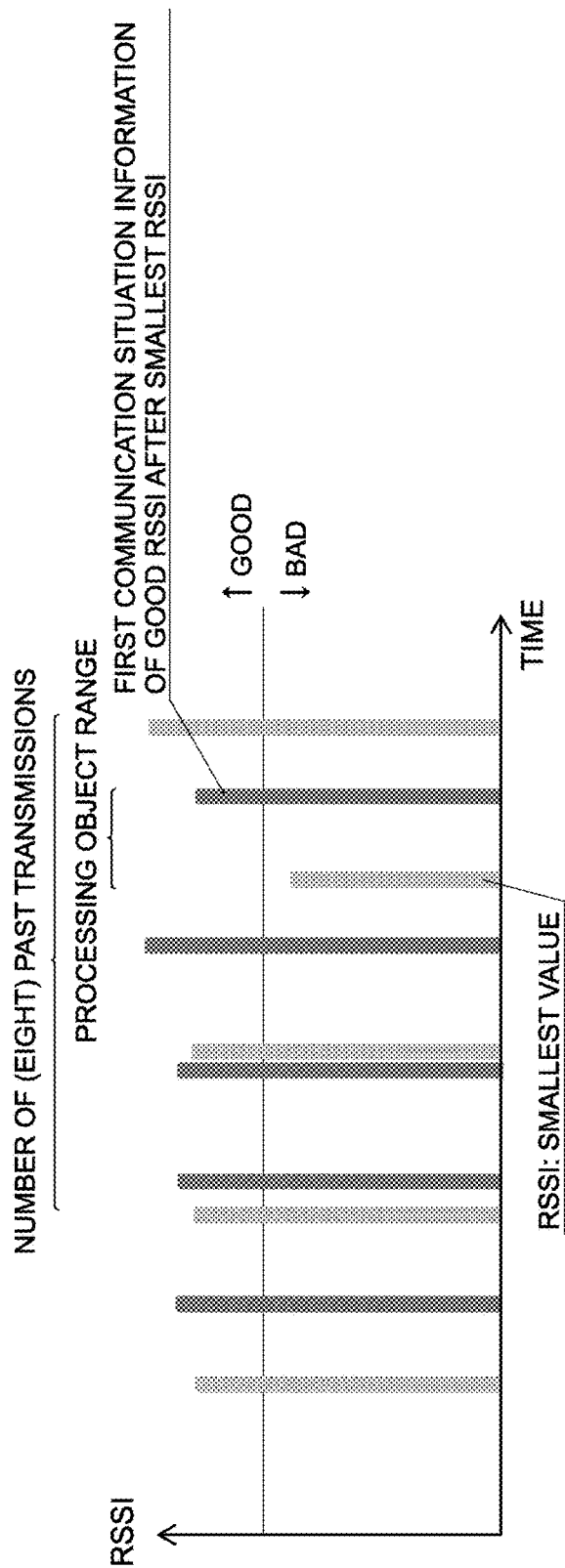

RADIO COMMUNICATION SYSTEM AND NON-TRANSITORY COMPUTER-READABLE STORAGE MEDIUM

TECHNICAL FIELD

The present invention relates to a radio communication system in which unidirectional radio communication is performed from a plurality of slave devices to a master device and relates to a non-transitory computer-readable storage medium stored with a failure factor estimation program for estimating a factor of a communication failure in such a radio communication system.

BACKGROUND ART

It has become commonplace to see radio transmission apparatuses (hereinafter, described as slave devices) not equipped with a receiving function such as a switch with an added radio signal transmission function being arranged at various locations of a production line or the like and, based on radio signals from the respective slave devices, a single radio reception apparatus (hereinafter, described as a master device) managing states of the various locations.

When constructing a unidirectional radio communication system in which unidirectional radio communication is performed from a plurality of slave devices to a master device such as that described above, while a position of each device is determined so that communication between each slave device and the master device can be carried out in a favorable manner, there may be cases where, after operation of the unidirectional radio communication system is started, an obstacle on a communication path causes radio field strength reaching the master device to drop excessively and, as a result, radio communication fails (the master device becomes incapable of receiving radio signals). In addition, there may be cases where radio communication fails due to a radio wave collision (a collision between radio signals from a plurality of slave devices or a collision between a radio signal from a slave device and a radio wave from another apparatus).

Existing unidirectional radio communication systems are not equipped with a function for notifying a user as to whether a drop in radio field strength due to an obstacle or a radio wave collision is a factor in radio communication failure. Therefore, in order to restore a unidirectional radio communication system in which a communication failure (a radio communication failure) has occurred to a state where radio communication can be performed normally, various tests for specifying a factor of the radio communication failure must be performed.

As long as bidirectional radio communication is concerned, various techniques (for example, PTL1) are developed for the purpose of notifying a user of a factor preventing radio communication from being performed. However, techniques related to bidirectional radio communication cannot be applied to unidirectional radio communication systems in which radio communication cannot be performed from a master device to slave devices.

PTL1: Japanese Patent Application Laid-open No. 2016-15652

SUMMARY OF THE INVENTION

Technical Problem

The present invention has been made in consideration of the circumstances described above and an object thereof is to provide a technique which enables a user to be notified of an estimated factor of a communication failure during unidirectional radio communication from a slave device to a master device.

Solution to Problem

In order to achieve the object described above, in a radio communication system according to the present invention, which includes a plurality of slave devices, a master device, and a failure factor estimation apparatus and in which unidirectional radio communication from each of the plurality of slave devices to the master device is performed, each slave device includes a radio communication unit which repetitively transmits, a plurality of times, a radio signal with a prescribed frequency that includes device identification information of the slave device itself during radio communication with the master device. In addition, the master device of the radio communication system according to the present invention includes: a specifying unit which specifies, each time the radio signal of a prescribed frequency is received, the device identification information included in the received radio signal and reception strength of the radio signal; and an information generating unit which generates, based on a specification result by the specifying unit, for each radio communication, communication situation information indicating a transmission source device of the radio communication, a reception success rate and received signal strength of a radio signal during the radio communication, and a time and date at which the radio communication has been performed. Furthermore, the failure factor estimation apparatus of the radio communication system according to the present invention includes: a retention unit which retains each piece of communication situation information generated by the information generating unit of the master device; and a failure factor estimating unit which, based on communication situation information with respect to processing-object radio communication retained in the retention unit, determines whether or not a communication failure in which the received signal strength is lower than prescribed strength and/or the reception success rate is lower than a prescribed rate has occurred during the processing-object radio communication, and in a case where the communication failure has occurred during the processing-object radio communication, generates and outputs failure factor presentation information indicating a failure inducer estimated to have induced the communication failure and an estimation result of a relative position of the failure inducer with respect to a transmission source device of the processing-object radio communication and/or the master device by using communication situation information with respect to one or more radio communications other than the processing-object radio communication which are retained in the retention unit.

In other words, each slave device of the radio communication system according to the present invention repetitively transmits, a plurality of times, a radio signal with a prescribed frequency that includes device identification information of the slave device itself during radio communication (unidirectional radio communication) to the master device. In addition, the master device of the radio communication system according to the present invention generates communication situation information including a reception success rate and received signal strength of a radio signal during each radio communication. The communication situation information is information which enables whether or not a radio wave collision has occurred to be determined from the reception success rate and which enables whether or not a drop in radio field strength due to an obstacle has occurred to be determined from the received signal strength. In addition, based on communication situation information generated by the master device with respect to a plurality of radio communications including a processing-object radio communication, the failure factor estimation apparatus of the radio communication system according to the present invention determines whether or not a communication failure in which the received signal strength is lower than prescribed strength and/or the reception success rate is lower than a prescribed rate has occurred during the processing-object radio communication, and in a case where the communication failure has occurred during the processing-object radio communication, generates and outputs failure factor presentation information indicating a failure inducer estimated to have induced the communication failure and an estimation result of a relative position of the failure inducer with respect to a transmission source slave device of the processing-object radio communication and/or the master device. Therefore, a user of the radio communication system according to the present invention can promptly specify a factor having induced a communication failure based on failure factor presentation information output by the failure factor estimation apparatus. In addition, as a result thereof, the user can promptly restore the radio communication system in which a communication failure has occurred to a normal state. It should be noted that, in the radio communication system according to the present invention, a "communication failure" refers to a state where, although communication (transmission of information) itself is possible, communication quality has declined.

An output method of failure factor presentation information by the failure factor estimating unit of the failure factor estimation apparatus of the radio communication system according to the present invention may be any method as long as the user can confirm contents of output failure factor presentation information. Accordingly, the failure factor estimating unit may be a unit which displays failure factor presentation information on a display, a unit which outputs failure factor presentation information by sound, or a unit which transmits failure factor presentation information to a portable terminal or the like of the user. In addition, the failure factor estimation apparatus of the radio communication system according to the present invention may be an apparatus which differs from the master device or an apparatus housed inside a case of the master device.

The failure factor presentation information output by the failure factor estimating unit need only be information directly or indirectly indicating a failure inducer estimated to have induced a communication failure and an estimation result of a relative position of the failure inducer with respect to a transmission source slave device of the processing-object radio communication and/or the master device. For example, in addition to adding an accepting unit which accepts a time range set by the user as a processing-object time range, a unit which handles each radio communication performed within the processing-object time range accepted by the accepting means as the processing-object radio communication may be adopted as the failure factor estimating unit. In addition, failure factor presentation information may be information indicating the estimation result and the fact that an interval between a transmission source device of the processing-object radio communication and the master device has increased.

The radio communication system according to the present invention may adopt a failure factor estimation apparatus further including a specifying unit which specifies, based on communication situation information with respect to a set number of recently performed radio communications by one or a plurality of slave devices designated by the user, an estimation object time range to be an object of estimation of a failure factor, out of the set number of radio communications, and when the estimation object time range is specified by the specifying unit, the failure factor estimating unit handles each radio communication performed within the estimation object time range by the one or the plurality of slave devices designated by the user as the processing-object radio communication. Adopting such a failure factor estimation apparatus enables a load on a CPU inside the failure factor estimation apparatus during failure factor estimation to be reduced and prevents the number of pieces of generated failure factor presentation information from increasing excessively.

Moreover, as the specifying unit of the failure factor estimation apparatus configured as described above, for example, a unit may be adopted which, based on communication situation information with respect to the set number of recently performed radio communications by the one or the plurality of slave devices, retrieves, from the radio communications, a radio communication with highest received signal strength and a radio communication with lowest received signal strength and specifies as the estimation object time range a time range having a time and date, at which each retrieved radio communication has been performed, as a boundary. In addition, as the specifying unit, a unit may be adopted which, based on communication situation information with respect to the set number of recently performed radio communications by the one or the plurality of slave devices, retrieves a lowest strength radio communication with lowest received signal strength and a highest strength radio communication with highest received signal strength performed by a slave device having performed the lowest strength radio communication among the radio communications, and specifies as the estimation object time range a time range having a time and date, at which the retrieved highest strength radio communication has been performed, and a time and date, at which the retrieved lowest strength radio communication has been performed, as boundaries.

As the failure factor estimating unit of the radio communication system according to the present invention, a unit may be adopted which "determines whether or not the communication failure has occurred with respect to each radio communication performed within a prescribed time range including a time and date at which the processing-object radio communication has been performed, and based on a determination result with respect to each radio communication, estimates a relative position of the failure inducer with respect to a transmission source device of the processing-object radio communication and/or the master device". In addition, as the failure factor estimating unit, a unit may be adopted which "in a case where a first communication failure in which the received signal strength is lower than the prescribed strength and the reception success rate is equal to or higher than the prescribed rate has occurred during the processing-object radio communication, generates first information indicating that the failure inducer is an obstacle on a communication path and indicating an estimation result of a relative position of the obstacle with respect to a transmission source slave device of the processing-object radio communication and/or the master device as the failure factor presentation information, and in a case where a second communication failure in which the received signal strength is equal to or higher than the prescribed strength and the reception success rate is lower than the prescribed rate has occurred during the processing-object radio communication, generates second information indicating that the failure inducer is a generation source of a radio wave and indicating an estimation result of a relative position of the generation source with respect to a transmission source slave device of the processing-object radio communication and/or the master device as the failure factor presentation information".

When adopting a failure factor estimating unit which generates the first or second information as the failure factor presentation information, a function for generating the first information as the failure factor presentation information when a third communication failure in which the received signal strength is lower than the prescribed strength and the reception success rate is lower than the prescribed rate has occurred during the processing-object radio communication may be added to the failure factor estimating unit.

In addition, the radio communication system according to the present invention may adopt a configuration in which "the radio communication system further includes: a plurality of second slave devices which, when transmitting information to the master device, repetitively transmits, a plurality of times, a radio signal with a second prescribed frequency that includes transmission information to be transmitted to the master device and device identification information of the slave device itself; and a repeater which receives a radio signal with the second prescribed frequency and which notifies, with a radio signal, the master device of the transmission information and the device identification information included in the received radio signal together with device identification information of the repeater itself, wherein the repeater includes: a second specifying unit which specifies, each time a radio signal with the second prescribed frequency is received, the device identification information included in the received radio signal and reception strength of the radio signal; and a second information generating unit which generates, based on a specification result by the second specifying unit, for each radio communication, second communication situation information indicating a transmission source device of the radio communication, a reception success rate and received signal strength of a radio signal during the radio communication, and a time and date at which the radio communication has been performed, and the failure factor estimation apparatus further includes: a second retention unit which retains each piece of second communication situation information generated by the second information generating unit of the repeater; and a second failure factor estimating unit which, based on second communication situation information with respect to a second processing-object radio communication retained in the second retention unit, determines whether or not the communication failure has occurred during the second processing-object radio communication, and in a case where the communication failure has occurred during the second processing-object radio communication, generates and outputs failure factor presentation information indicating a failure inducer estimated to have induced the communication failure and an estimation result of a relative position of the failure inducer with respect to a transmission source device of the second processing-object radio communication and/or the repeater by using second communication situation information with respect to one or more radio communications other than the second processing-object radio communication which are retained in the second retention unit". Moreover, adopting this configuration enables a radio communication system capable of also promptly specifying a factor of a communication failure having occurred between a second slave device and a repeater to be realized.

In addition, a non-transitory computer-readable storage medium according to the present invention is stored with a failure factor estimation program which, when being executed by an information processing apparatus, causes the information processing apparatus to operate as a failure factor estimation apparatus of the radio communication system according to the present invention. Therefore, with the non-transitory computer-readable storage medium according to the present invention, the radio communication system according to the present invention can be realized using an ordinary information processing apparatus.

According to the present invention, since a user can be notified of an estimated factor of a communication failure during unidirectional radio communication from a slave device to a master device, a state where a communication failure has occurred can be promptly restored to a normal state.

BRIEF DESCRIPTION OF THE DRAWINGS

FIG. 16 is an explanatory diagram of a fourth mode of the radio communication system according to the third embodiment.

DESCRIPTION OF EMBODIMENTS

Hereinafter, embodiments of the present invention will be described with reference to the drawings.

First Embodiment

Figure 1:
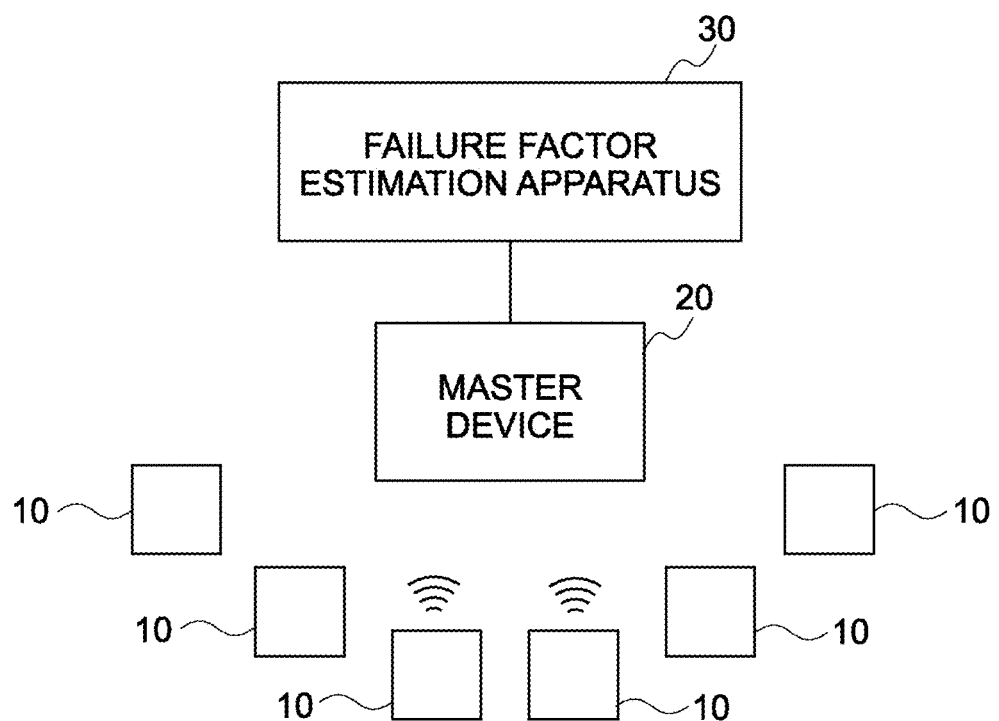
FIG. 1 is a schematic configuration diagram of a radio communication system according to a first embodiment of the present invention.

FIG. 1 shows a schematic configuration of a radio communication system according to a first embodiment of the present invention.

The radio communication system according to the present embodiment is a system which is constituted by a plurality of slave devices (child devices) 10, a master device (parent device) 20, and a failure factor estimation apparatus 30 and in which unidirectional radio communication from each slave device 10 to the master device 20 is performed.

A function for providing a user with a hint message (details will be provided later) indicating an object estimated to have induced a communication failure having occurred during unidirectional radio communication between the slave device 10 and the master device 20 and an estimated position of the object is added to the radio communication system according to the present embodiment. It should be noted that, in the description of the radio communication system according to the present embodiment, a communication failure refers to a state where, although communication (transmission of information) itself is possible, communication quality has declined.

In order to add the function described above, as each slave device 10, the radio communication system uses an apparatus which repetitively transmits a radio signal with a prescribed frequency that includes device identification information (hereinafter, a device ID) of the apparatus itself N ($\geq 2$) number of times at a prescribed repetition period during radio communication with the master device 20.

Figure 2:
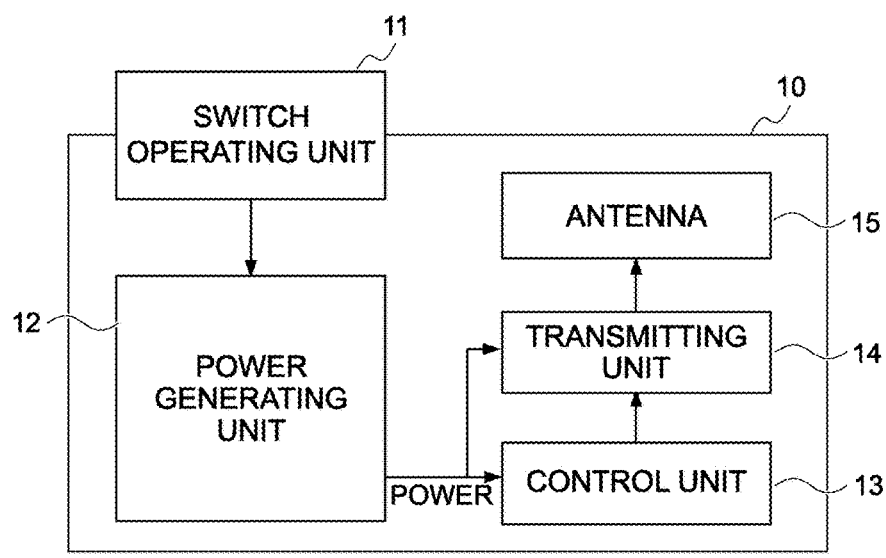
FIG. 2 is a schematic configuration diagram of a slave device used in the radio communication system according to the first embodiment.

Specifically, as each slave device 10, the radio communication system uses an apparatus having a configuration shown in FIG. 2 or, in other words, an apparatus including a switch operating unit 11, a power generating unit 12, a control unit 13, a transmitting unit 14, and an antenna 15.

The slave device 10 is an apparatus to be arranged in a vicinity of various management objects. In this case, a management object refers to an apparatus (a forklift, a manufacturing apparatus, or the like) inside a facility (a plant or the like), a task to be performed by a person, and the like.

The switch operating unit 11 is a mechanism constituted by a push button, a spring for pushing back the push button having been pressed down, and the like. The power generating unit 12 is a unit which performs power generation based on a pressing force on the push button of the switch operating unit 11. As the power generating unit 12, a unit can be adopted which is constituted by a power generating mechanism which generates electric energy by converting a movement of the push button into a relative movement between a coil and a magnet, a bridge circuit which rectifies an output of the power generating mechanism, a capacitor which is charged by an output from the bridge circuit, and a regulator which regulates a voltage between terminals of the capacitor into a prescribed voltage. Alternatively, the power generating mechanism of the power generating unit 12 may generate electric energy by transmitting a pressing force applied to the push button to a piezoelectric element.

The transmitting unit 14 is a unit which modulates a signal of which transmission is instructed by the control unit 13 and transmits the modulated signal from the antenna 15, and which is operated by power from the power generating unit 12.

The control unit 13 is also a unit which is operated by power from the power generating unit 12. The control unit 13 is constituted by an integrated circuit (a microprocessor, a digital encoder, or the like), a setting mechanism (a dip switch or a jumper pin) which allows the user to set any of two types of control output information (ON information and OFF information: applications thereof will be described later) as control output information to be included in a radio signal, and the like.

A device ID is set to the integrated circuit of the control unit 13. When power is supplied to the control unit 13 (integrated circuit) from the power generating unit 12 (or in other words, when the push button is pressed down), the control unit 13 (the integrated circuit) instructs the transmitting unit 14 to repetitively transmit a radio signal including the set device ID and control output information N ($\geq 2$) number of times at a prescribed repetition period. Subsequently, the transmitting unit 14 transmits the radio signal with the contents described above N-number of times in accordance with the instruction from the control unit 13.

Furthermore, in order to add a function for providing the user with a hint message (details will be described later), the radio communication system uses the master device 20 equipped with the following functions.

A specification function which specifies, each time a radio signal with a prescribed frequency (a radio signal transmitted by each slave device 10) is received, a device ID included in the received radio signal and received signal strength (received signal strength indicator: RSSI) of the radio signal An information generation function which generates, based on a specification result by the specification function, for each radio communication, communication situation information indicating the slave device 10 that is a transmission source of the radio communication, a reception success rate and received signal strength of a radio signal during the radio communication, and a communication time and date of the radio communication Hereinafter, the master device 20 will be described in greater detail with reference to FIGS. 3 and 4. Moreover, FIG. 3 is a schematic configuration diagram of the master device 20, and FIG. 4 is a flowchart of a display/output control process executed by a control unit 23 in the master device 20 shown in FIG. 3.

Figure 3:
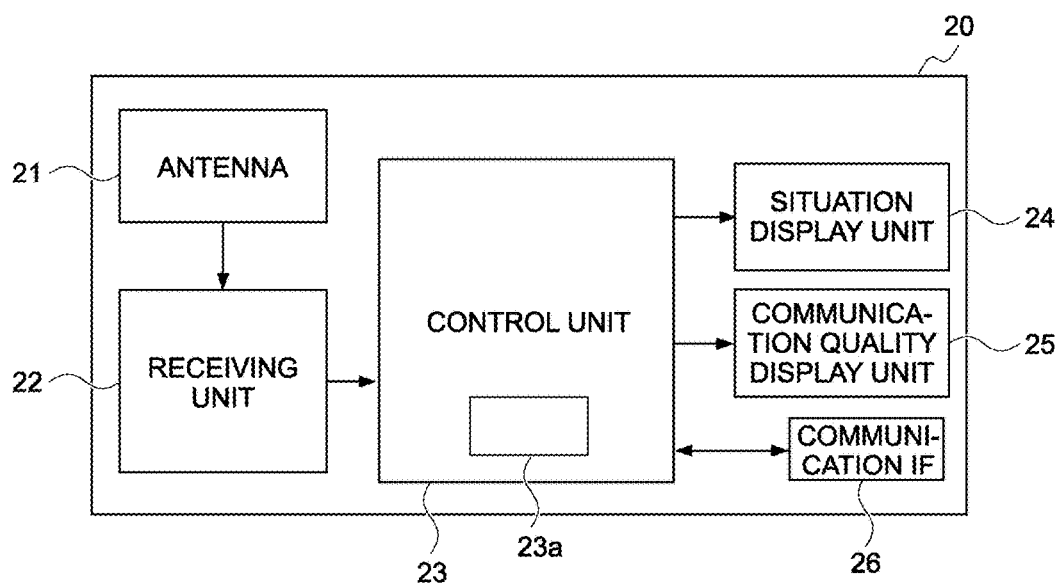
FIG. 3 is a schematic configuration diagram of a master device used in the radio communication system according to the first embodiment.
Figure 4:
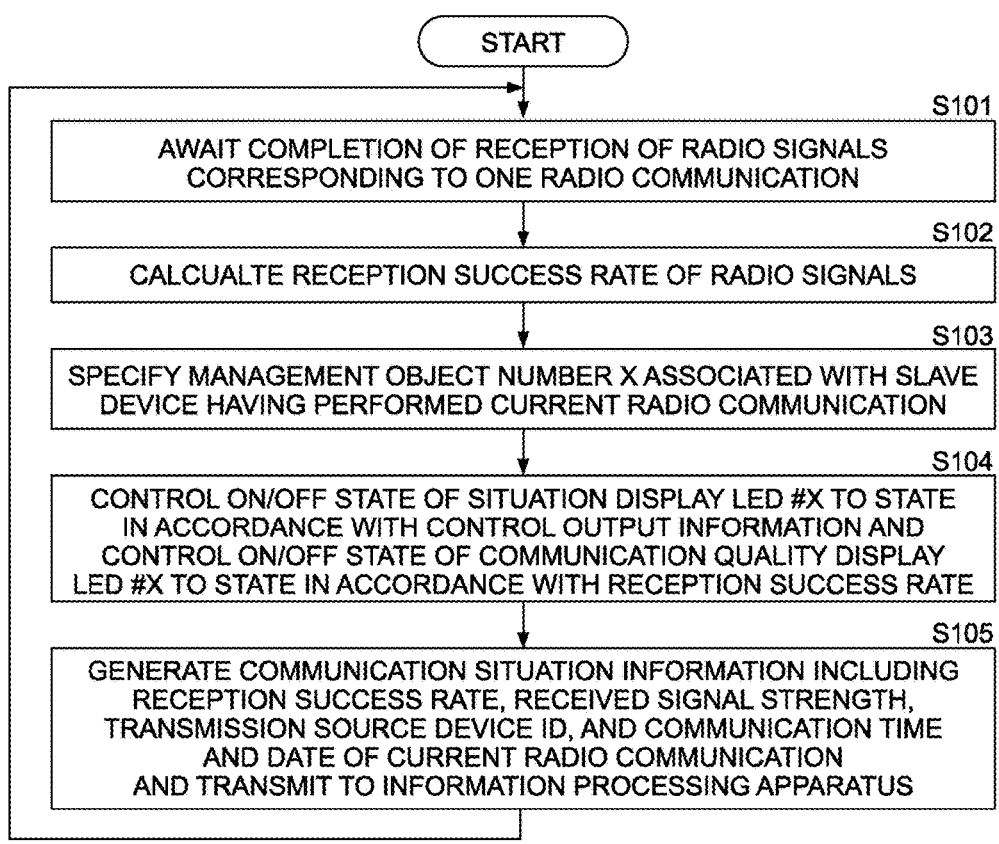
FIG. 4 is a flow chart of a display/output control process executed by a control unit of the master device of the radio communication system according to the first embodiment.

As shown in FIG. 3, the master device 20 includes an antenna 21, a receiving unit 22, the control unit 23, a situation display unit 24, a communication quality display unit 25, and a communication interface (communication IF) 26. Moreover, the master device 20 is an apparatus which is used when connected to a commercial power supply. Therefore, the master device 20 also includes a power supply circuit (not illustrated) which steps down voltage from the commercial power supply and supplies a step-down voltage to each unit.

The receiving unit 22 is a unit which receives a radio signal from each slave device 10 via the antenna 21 and which notifies the control unit 23 of a device ID and control output information in the received radio signal together with received signal strength (received signal strength indicator:

RSSI) of the received radio signal. When the reception strength of the received radio signal is below sufficient strength (hereinafter, described as threshold strength) to comprehend contents of the received radio signal, the receiving unit 22 does not notify anything to the control unit 23. In other words, only when the receiving unit 22 receives a radio signal having threshold strength or more, the receiving unit 22 notifies the control unit 23 of a device ID and control output information included in the received radio signal as well as reception strength (≥threshold strength) of the radio signal.

The situation display unit 24 is a unit constituted by situation display LEDs #1 to #M arranged on a front panel of the master device 20. The communication quality display unit 25 is a unit constituted by communication quality display LEDs #1 to #M arranged on the front panel of the master device 20. A situation display LED #k (k=1 to M) of the situation display unit 24 and a communication quality display LED #k of the communication quality display unit 25 are arranged side by side on the front panel of the master device 20 so as to make it understood that the display LEDs #k display information related to a same management object #k.

The communication interface 26 is an interface (a USB interface or the like) for communicating with the failure factor estimation apparatus 30.

The control unit 23 is a unit constituted by a processor (a CPU or a microprocessor), a storage apparatus 23a (in the present embodiment, a ROM and a RAM), and the like. The storage apparatus 23a (ROM) stores a program created to be used by the master device 20, and when the processor reads the program onto the RAM and executes the program, the control unit 23 functions as a unit which performs a slave device ID setting reception process and a display/output control process.

The slave device ID setting reception process is a process of receiving a setting by a user of a device ID of each slave device 10 arranged (or, to be arranged) in a vicinity of each management object #k (k=1 to M). The slave device ID setting reception process is a process that is preferably executed before start of an actual operation of the radio communication system. For example, a user (a manager) of the radio communication system causes the master device 20 to execute the slave device ID setting reception process by connecting a computer to the communication interface 26 of the master device 20 and operating the computer.

Once the slave device ID setting reception process is performed, under the control of the control unit 23, correspondence relationship information indicating a correspondence relationship between each of the plurality of management object numbers k and one or more device IDs is registered (stored) in the storage apparatus 23a. Subsequently, when registration of the correspondence relationship information is completed, the control unit 23 starts a display/output control process including a procedure shown in FIG. 4.

Specifically, the control unit 23 having started the present display/output control process due to completion of registration of correspondence relationship information awaits (monitors) reception of radio signals corresponding to one radio communication to be completed based on information from the receiving unit 22 (step S101). As already described, during radio communication with the master device 20, each slave device 10 repetitively transmits a radio signal including a device ID of the slave device 10 itself and control output information N-number of times at a prescribed repetition period. Therefore, in step S101, the control unit 23 determines whether or not reception of radio signals corresponding to one radio communication has been completed using information (device ID) from the receiving unit 22 and the repetition period.

When the reception of radio signals corresponding to one radio communication has been completed, the control unit 23 calculates a reception success rate by dividing the number of radio signals received during the current radio communication by N (step S102). Next, the control unit 23 specifies a management object number X associated with the slave device 10 having performed the current radio communication (step S103). More specifically, the control unit 23 reads, from the correspondence relationship information, a management object number X associated with the device ID (hereinafter, described as a transmission source device ID) included in each radio signal (all radio signals) received during the current radio communication (step S103).

Subsequently, in step S104, the control unit 23 performs the following process.

When the control output information in each currently-received radio signal is ON information, the control unit 23 controls a state of a communication quality display LED #X to an ON state (a lighted state). In addition, when the control output information is OFF information, the control unit 23 controls the state of the communication quality display LED #X to an OFF state (a turned-off state). Furthermore, when the reception success rate is equal to or higher than a prescribed rate and the received signal strength is equal to or higher than prescribed strength, the control unit 23 controls the state of the communication quality display LED #X to the ON state, but if not, the control unit 23 controls the state of the communication quality display LED #X to the OFF state. Moreover, the prescribed strength refers to a value set in advance as a threshold (a lower limit value) of the received signal strength at which communication quality is determined favorable. In addition, the prescribed rate refers to a value set in advance as a threshold (a lower limit value) of the reception success rate at which communication quality is determined favorable. Normally, 1 (100%) is used as the prescribed rate.

The control unit 23 having finished the process of step S104 transmits communication situation information including the reception success rate, the received signal strength, the transmission source device ID, and a communication time and date of the current radio communication with the failure factor estimation apparatus 30 (step S105). When only one radio signal is received during the current radio communication, the received signal strength which the control unit 23 includes in the communication situation information is the received signal strength of the radio signal, and when 2 to N-number of radio signals are received during the current radio communication, the received signal strength which the control unit 23 includes in the communication situation information is a smallest value of the received signal strengths of the radio signals. Alternatively, the received signal strength to be included in the communication situation information may be received signal strength of an initially-received radio signal, an average value of received signal strengths of the 2 to N-number of received radio signals, or the like.

The control unit 23 having finished the process of step S105 returns to step S101 and once again awaits reception of radio signals corresponding to one radio communication to be completed.

The failure factor estimation apparatus 30 (FIG. 1) is an apparatus which, based on each piece of communication situation information transmitted from the master device 20, presents a user with a hint message indicating an object estimated to have induced a communication failure having occurred during unidirectional radio communication between the slave device 10 and the master device 20 and an estimated position of the object.

Figure 5:
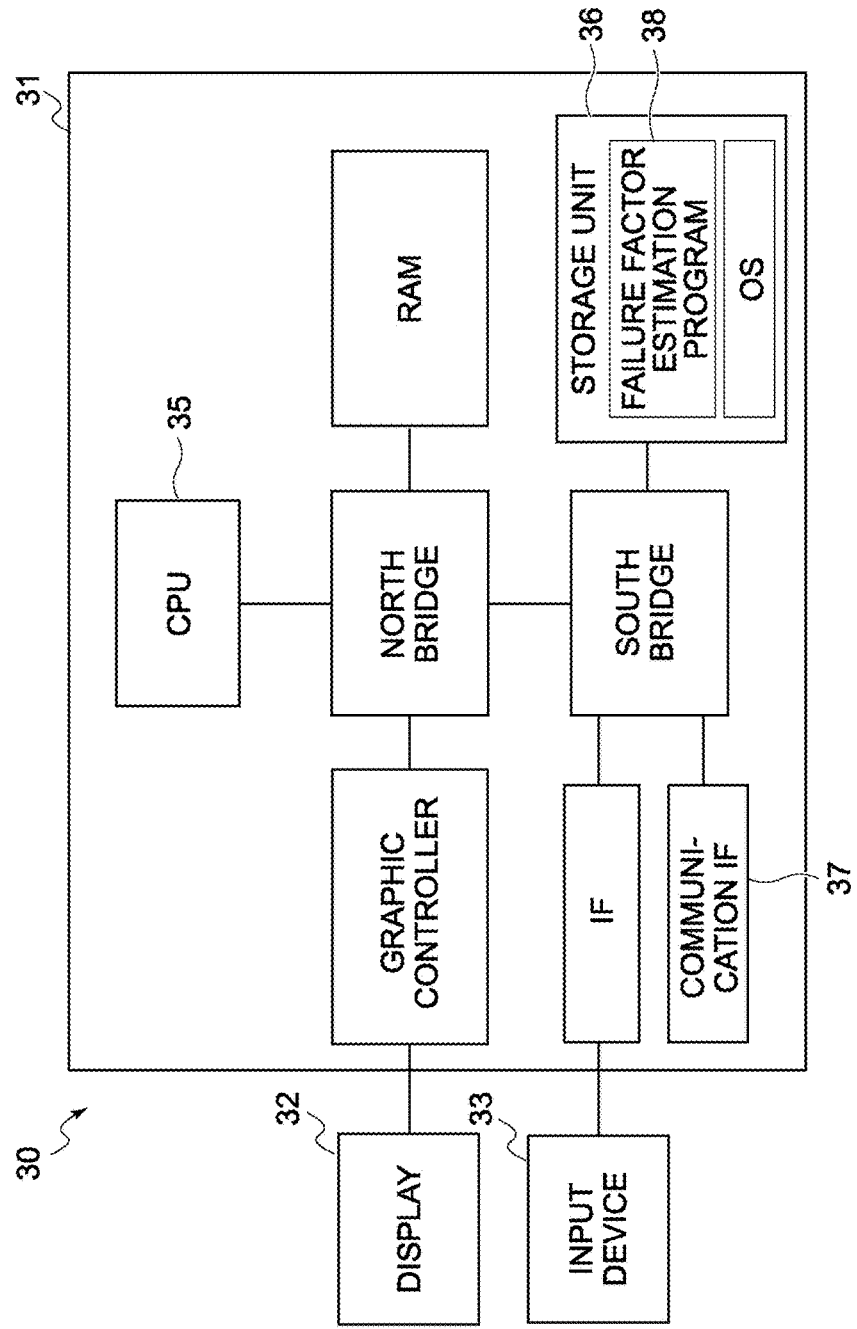
FIG. 5 is a schematic configuration diagram of a failure factor estimation apparatus of the radio communication system according to the first embodiment.

FIG. 5 shows a schematic configuration of the failure factor estimation apparatus 30.

As illustrated, the failure factor estimation apparatus 30 is a so-called computer and includes a computer main body 31, a display 32, and an input device 33. The computer main body 31 is an apparatus constituted by a CPU 35, a non-volatile storage unit 36 (an HDD or an SSD), a RAM, a communication interface (communication IF) 37 for communicating with the master device 20, an interface (IF) for the input device 33 (a keyboard, a mouse, or the like), and the like. An OS and a failure factor estimation program 38 developed for the present radio communication system are installed in the storage unit 36 of the computer main body 31. It should be noted that the failure factor estimation apparatus 30 shown in FIG. 5 is a so-called desktop PC in which the failure factor estimation program 38 has been installed. However, a computer in which the failure factor estimation program 38 is to be installed may be a notebook PC or a tablet PC.

Hereinafter, functions of the failure factor estimation apparatus 30 will be described.

The failure factor estimation program 38 includes a first program and a second program.

The first program is a resident program which causes the CPU 35 to perform the following processes.

A communication situation information saving process of receiving each piece of communication situation information from the master device 20 and saving the communication situation information in the storage unit 36

A process of acquiring correspondence relationship information from the master device 20 and storing the correspondence relationship information in the storage unit 36 when correspondence relationship information is not stored in the storage unit 36

Figure 6:
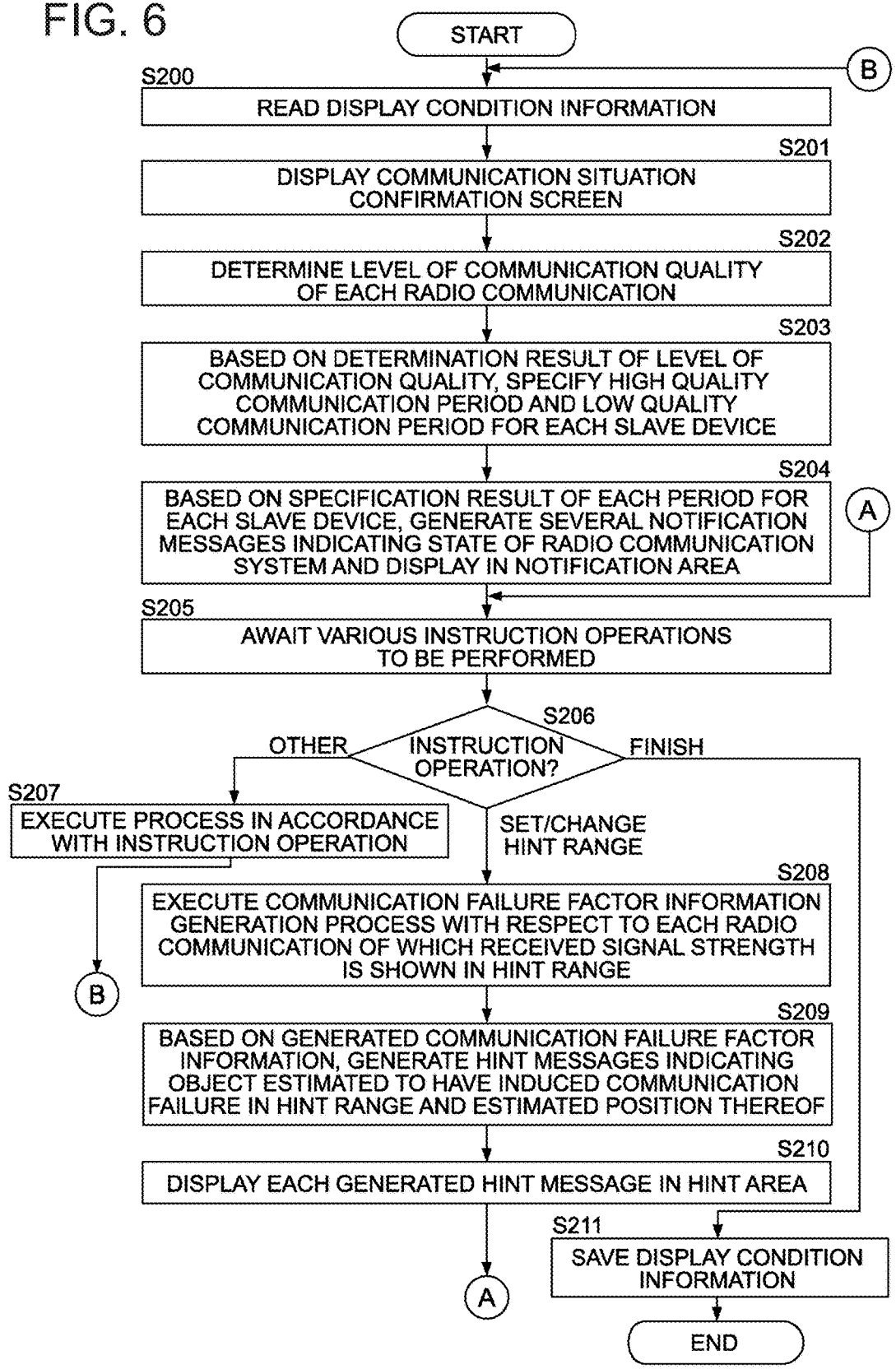
FIG. 6 is a flow chart of a failure factor estimation process executed by a CPU in the failure factor estimation apparatus of the radio communication system according to the first embodiment.

A process of re-acquiring correspondence relationship information from the master device 20 when a device ID in the received communication situation information is not included in the correspondence relationship information stored in the storage unit 36, and updating the correspondence relationship information in the storage unit 36 with the acquired correspondence relationship information The second program is a program which causes the CPU 35 to perform a failure factor estimation process including a procedure shown in FIG. 6. The CPU 35 starts the failure factor estimation process (the second program) when an instruction to execute this failure factor estimation process is issued by the user.

As shown in FIG. 6, the CPU 35 having started the failure factor estimation process first reads display condition information from the storage unit 36 onto the RAM (step S200). While details of the display condition information will be provided later, the display condition information read onto the RAM in the current step S200 is information saved in the storage unit 36 upon ending the failure factor estimation process (refer to step S211). In addition, when display condition information has not been saved in the storage unit 36 during the process of step S200, the CPU 35 generates display condition information on the RAM based on the correspondence relationship information having been acquired from the master device 20.

The CPU 35 having finished the process of step S200 displays a communication situation confirmation screen on the display 32 based on the display condition information on the RAM and the communication situation information in the storage unit 36 (step S201).

Figure 7:
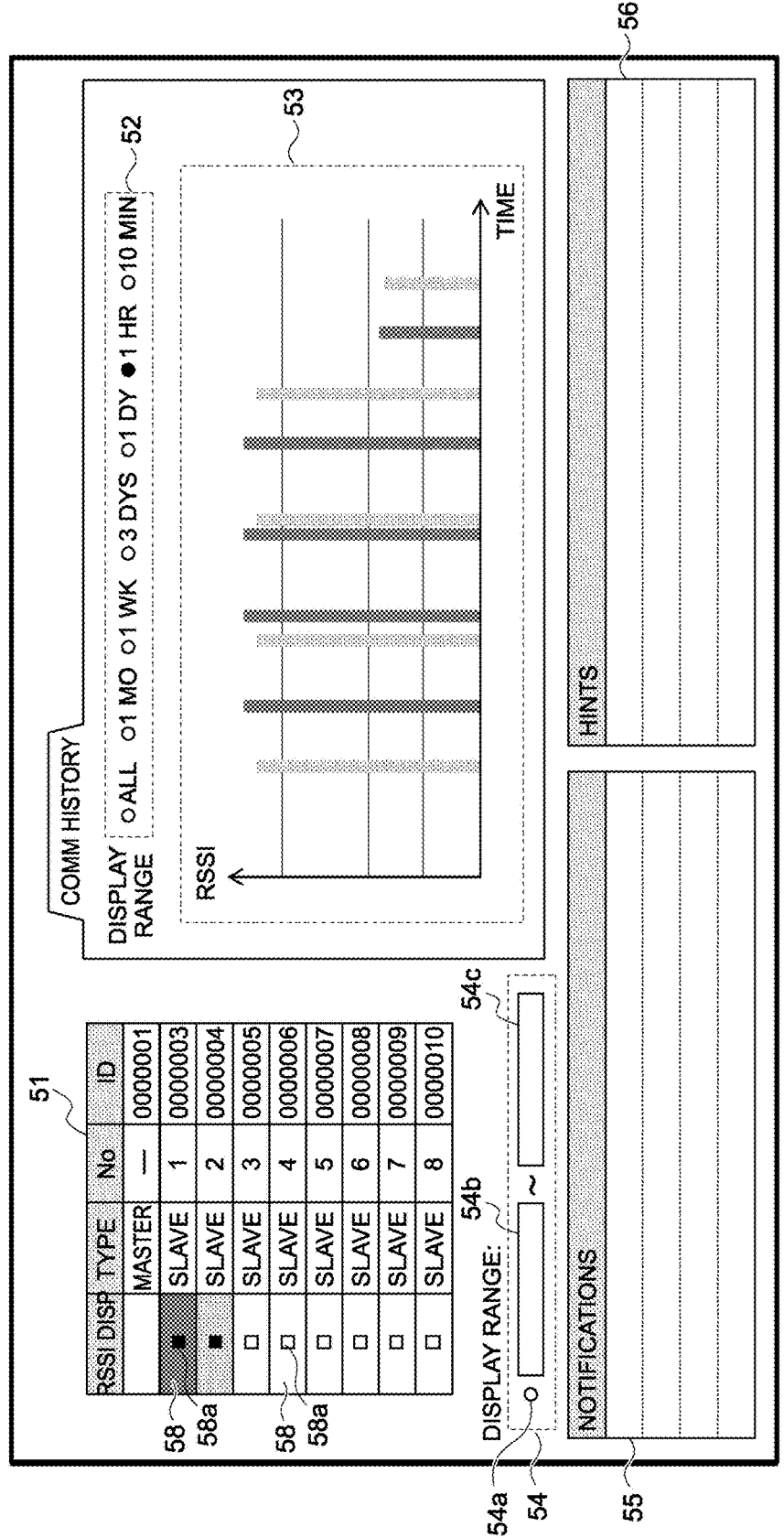
FIG. 7 is an explanatory diagram of a communication situation confirmation screen that is displayed on a display of a failure factor estimation apparatus during the failure factor estimation process shown in FIG. 6.

FIG. 7 shows a configuration of the communication situation confirmation screen. The failure factor estimation process is a process to be performed while updating the communication situation confirmation screen. Therefore, before describing details of the failure factor estimation process, an overview of the communication situation confirmation screen will be provided using FIG. 7.

As shown in FIG. 7, the communication situation confirmation screen includes an RSSI display object selection area 51, a display range selection area 52, a communication history display area 53, a display range input field 54, a notification area 55, and a hint area 56.

The RSSI display object selection area 51 is an area which enables a user to select a slave device 10 of which a communication history (received signal strength during radio communication) is to be displayed in the communication history display area 53. As illustrated, in the RSSI display object selection area 51, for each slave device 10, a management object number ("No") and a device ID ("ID") related to the slave device 10 are displayed together with an option button 58a for selecting whether or not to display a communication history. In addition, a same color as a display color of a communication history of each slave device 10 is displayed in an RSSI display field 58 (an RSSI display field 58 in which the option button 58a is turned ON) with respect to each slave device 10 selected as a display object of communication history. Hereinafter, a slave device 10 selected as a display object of communication history will be described as a history display object slave device.

The display range selection area 52 is an area which enables a user to select time range (hereinafter, described as a designated time range) of communication history to be displayed in the communication history display area 53. An end time and date of the time range selected using the display range selection area 52 is a start time and date of the process of step S201. When desiring to confirm past communication history which does not include recent communication history, the user designates a start time and date and an end time and date of a display range using the display range input field 54. Moreover, an option button 54a in the display range input field 54 is configured as an item which is enabled only when time and date information is set in a start time and date input field 54b and an end time and date input field 54c. When the option button 54a is turned ON, the CPU 35 handles the time range designated in the display range input field 54 as a designated time range, but when the option button 54a is turned OFF, the CPU 35 handles the time range selected in the display range selection area 52 as a designated time range.

The communication history display area 53 is an area in which received signal strength during each radio communication within the designated time range from each history display object slave device is displayed as a graph. The communication history display area 53 is an area which allows a range to be selected.

The notification area 55 is an area in which is displayed a notification message for notifying the user of the propriety of a communication situation of the radio communication system in the designated time range. A notification message with respect to radio communication from slave devices 10 not selected as display objects of communication history is also displayed in the notification area 55.

The hint area 56 is an area in which a hint message for notifying the user of an estimated factor of a communication failure having occurred during radio communication in the designated time range is displayed. Only a hint message with respect to a radio communication of which communication history (received signal strength) is shown in a range-selected range of the communication history display area 53 is displayed in the hint area 56.

Returning to FIG. 6, the description of the failure factor estimation process will be continued.

The display condition information prepared on the RAM in step S200 is information indicating which slave device 10 is a history display object slave device, a display color of communication history of each history display object slave device, and a designated time range. When display condition information is not saved in the storage unit 36 during the process of step S200, using correspondence relationship information having been acquired from the master device 20, the CPU 35 generates, on the RAM, display condition information indicating that all slave devices 10 are history display object slave devices, a display color of communication history of each history display object slave device, and the fact that the designated time range is one hour prior to the start time and date of the process of step S201.

In addition, based on the display condition information read from the storage unit 36 onto the RAM or the display condition information generated on the RAM, the CPU 35 determines display contents of each section of a communication situation confirmation screen and displays, on the display 32, a communication situation confirmation screen with contents in accordance with the display condition information (step S201). Moreover, in the communication situation confirmation screen displayed by the process of the current step S201, a hint message is to be displayed in the hint area 56. In step S201, same processes as the processes of steps S208 to S210 (details will be provided later) performed when a display range change instruction operation (an operation for instructing a change to the display time range) is carried out are performed in order to determine a hint message to be displayed in the hint area 56.

The CPU 35 having finished the process of step S201 determines a level (a propriety) of communication quality of each radio communication performed within the designated time range indicated by the display condition information (step S202). The process of step S202 is a process of determining whether communication quality of a radio communication is high or low depending on whether or not conditions (hereinafter, described as high quality conditions) in that the reception success rate is equal to or higher than a prescribed rate and the received signal strength is equal to or higher than the prescribed strength are satisfied. Moreover, as already described, the prescribed rate refers to a value set in advance as a threshold (a lower limit value) of the reception success rate at which communication quality is determined favorable. In addition, the prescribed strength refers to a value set in advance as a threshold (a lower limit value) of the received signal strength at which communication quality is determined favorable.

The CPU 35 having finished the process of step S202 specifies, for each slave device 10, a high quality communication period in which communication quality of radio communication is high and a low quality communication period in which communication quality of radio communication is low based on a determination result of whether communication quality of each radio communication is high or low (step S203).

Subsequently, based on a specification result of a high quality communication period and a low quality communication period with respect to each slave device 10, the CPU 35 generates several notification messages indicating a communication situation in the radio communication system and displays the notification messages in the notification area 55 (step S204).

Specifically, in current step S204, the CPU 35 performs the following process.

First, the CPU 35 determines whether or not one or more low quality communication periods have been specified in the process of step S203.

When one or more low quality communication periods have not been specified (in other words, when only high quality communication periods have been specified with respect to all slave devices 10), the CPU 35 generates a notification message describing that there is no problem whatsoever in the radio communication from each slave device 10 to the master device 20 within the designated time range. In addition, the CPU 35 displays the notification message in the notification area 55 and ends the process of step S204.

On the other hand, when one or more low quality communication periods have been specified, for each low quality communication period, the CPU 35 generates a notification message for notifying the user of the presence of the low quality communication period. In addition, the CPU 35 displays each notification message in the notification area 55 and ends the process of step S204.

Moreover, when one or more low quality communication periods have been specified, a notification message generated and displayed by the CPU 35 with respect to each low quality communication period should normally read "reachability of radio waves from a slave device X declines from time and date A to time and date B". However, when approximately the same low quality communication period is specified with respect to a plurality of slave devices 10, the CPU 35 generates and displays a notification message consolidating two or more types of notifications such as "reachability of radio waves from slave devices X and Y declines from time and date A to time and date B".

Once the process of step S204 is completed, the CPU 35 awaits various instruction operations to be performed by the user (step S205).

Instruction operations which the CPU 35 awaits (monitors) in the current step S205 include a history display object change instruction operation, a display range change instruction operation, a hint range setting/change instruction operation, and an end instruction operation.

The history display object change instruction operation is an operation to turn ON/OFF the option button 58a (FIG. 7). The display range change instruction operation is an operation with respect to the display range selection area 52 or the display range input field 54 (an operation to instruct a change to the display time range). When these instruction operations are performed (step S206: other), the CPU 35 performs a process in accordance with the performed instruction operation in step S207 and subsequently returns to step S201 to once again display the communication situation confirmation screen.

Specifically, when the option button 58a with respect to a certain slave device 10 (hereinafter, described as a target slave device) is turned ON (step S206: other), in step S211, the CPU 35 first selects a display color of communication history related to the target slave device from display colors not assigned to any of the history display object slave devices. Next, the CPU 35 updates the display condition information on the RAM to information indicating that the target slave device has been added as a history display object slave device and that the display color of communication history of the history display object slave device is the currently selected color. Subsequently, the CPU 35 returns to step S201 and once again displays the communication situation confirmation screen based on the updated display condition information.

In addition, when the option button 58*a* with respect to a certain slave device 10 (hereinafter, described as a target slave device) is turned OFF (step S206: other), in step S211, the CPU 35 updates the display condition information on the RAM to information indicating that the target slave device is not a history display object slave device. Subsequently, the CPU 35 returns to step S201 and once again displays the communication situation confirmation screen based on the updated display condition information.

When the designated time range is changed by an operation to the display range selection area 52 or the display range input field 54, the CPU 35 updates the display condition information on the RAM to information indicating a designated time range after the change. Subsequently, the CPU 35 returns to step S201 and once again displays the communication situation confirmation screen based on the updated display condition information.

The hint range setting/change instruction operation is an operation to designate a partial area in the communication history display area 53 as a hint area. When the hint range setting/change instruction operation is performed (step S206: set/change hint range), the CPU 35 executes a failure factor information generation process with respect to each radio communication of which received signal strength is shown in the hint range (step S208).

Figure 8:
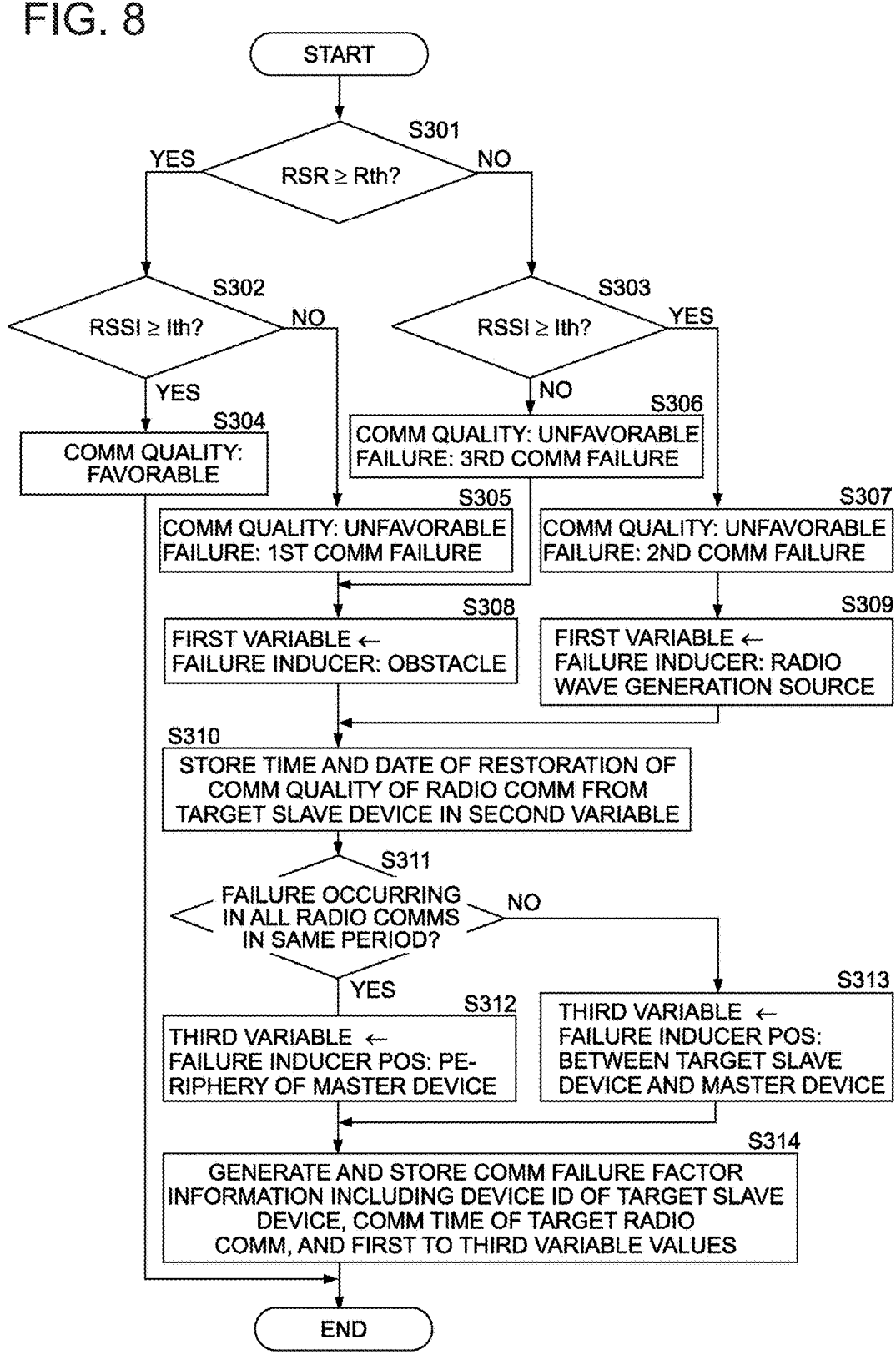
FIG. 8 is a flow chart of a failure factor information generation process executed in the failure factor estimation process shown in FIG. 6.

The failure factor information generation process is a process including a procedure shown in FIG. 8. It should be noted that, in FIG. 8 as well as the following description, a target radio communication refers to a radio communication set as a processing object of the failure factor information generation process, and a target slave device refers to the slave device 10 having performed the target radio communication.

As shown in FIG. 8, during the failure factor information generation process with respect to the target radio communication, the CPU 35 first determines whether or not a reception success rate (RSR) of the target radio communication is equal to or higher than a prescribed rate Rth (step S301).

When the reception success rate (RSR) of the target radio communication is equal to or higher than the prescribed rate Rth (step S301: YES), in step S302, the CPU 35 determines whether or not the received signal strength (RSSI) of the target radio communication is equal to or higher than the prescribed strength Ith. On the other hand, when the reception success rate (RSR) of the target radio communication is lower than the prescribed rate Rth (step S301: NO), in step S303, the CPU 35 determines whether or not the received signal strength (RSSI) of the target radio communication is equal to or higher than the prescribed strength Ith.

In addition, when the reception success rate (RSR) and the received signal strength (RSSI) of the target radio communication are respectively equal to or higher than the prescribed rate Rth and equal to or higher than the prescribed strength Ith (step S301: YES, step S302: YES), the CPU 35 identifies communication quality of the target radio communication as favorable (step S303) and ends the failure factor information generation process with respect to the target radio communication.

On the other hand, when the reception success rate (RSR) is equal to or higher than the prescribed rate Rth but the received signal strength (RSSI) of the target radio communication is lower than the prescribed strength Ith (step S301: YES, step S302: NO), the CPU 35 identifies the communication quality of the target radio communication as unfavorable and identifies a communication failure having occurred during the target radio communication as a first communication failure (step S304). In addition, when the reception success rate (RSR) is lower than the prescribed rate Rth but the received signal strength (RSSI) of the target radio communication is equal to or higher than the prescribed strength Ith (step S301: NO, step S303: YES), the CPU 35 identifies the communication quality of the target radio communication as unfavorable and identifies a communication failure having occurred during the target radio communication as a second communication failure (step S307). Furthermore, when the reception success rate (RSR) is lower than the prescribed rate Rth and the received signal strength (RSSI) of the target radio communication is lower than the prescribed strength Ith (step S301: NO, step S303: NO), the CPU 35 identifies the communication quality of the target radio communication as unfavorable and identifies a communication failure having occurred during the target radio communication as a third communication failure (step S306).

Subsequently, when the communication failure having occurred during the target radio communication is the second communication failure, the CPU 35 stores a value indicating that a communication failure inducer (an object having induced a communication failure) is a generation source of radio waves in a first variable (step S309). In this case, the first variable is a variable for temporarily storing a value to be used as an element of failure factor information that is generated in the process of step S314. Second and third variables to be described later are also variables for temporarily storing a value used to be as an element of failure factor information.

When the communication failure having occurred during the target radio communication is the first communication failure, the CPU 35 stores a value indicating that the communication failure inducer is an obstacle on a path of the target radio communication in the first variable (step S308). In addition, when the communication failure having occurred during the target radio communication is the third communication failure, the CPU 35 also stores a value indicating that the communication failure inducer is an obstacle on a path of the target radio communication in the first variable (step S308).

The process of step S308 is performed when the communication failure having occurred during the target radio communication is the third communication failure (in which the reception success rate (RSR) is lower than the prescribed rate Rth and the received signal strength (RSSI) is lower than the prescribed strength) because when the received signal strength declines, the reception success rate (RSR) often drops even if a collision does not occur. However, since there may be cases where a collision and a decline in the received signal strength due to an obstacle occur at the same time, when the communication failure having occurred during radio communication is the third communication failure, the failure factor information generation process (the process shown in FIG. 8) may be modified to a process in which a value indicating that the communication failure inducer is a generation source of radio waves or an obstacle is stored in the first variable.

In step S310, the CPU 35 having finished the process of step S308 or S309 performs a process of attempting to specify a time and date of restoration of the communication quality of the radio communication from the target slave device and storing the specified time and date of restoration in the second variable.

More specifically, in step S310, for each radio communication from the target slave device performed after the target radio communication, the CPU 35 checks whether or not high quality conditions (the reception success rate is equal to or higher than the prescribed rate and the received signal strength is equal to or higher than the prescribed strength) are satisfied in an ascending order of the communication times and dates. In addition, when the CPU 35 is able to find a radio communication satisfying the high quality conditions, the CPU 35 stores a communication time and date of the radio communication in the second variable, but when the CPU 35 is unable to find a radio communication satisfying the high quality conditions, the CPU 35 stores a value indicating that a communication anomaly has occurred in all radio communications from the target slave device after the target radio communication in the second variable.

The CPU 35 having finished the process of step S310 determines whether or not a communication anomaly has occurred in all radio communications in a same period as the target radio communication (step S311). The process of step S311 is a process of determining whether or not a communication anomaly has occurred in all radio communications of all the slave devices 10 performed within a prescribed time range centered on the communication time and date of the target radio communication. Therefore, when a communication anomaly has not occurred in a radio communication in the same period from a certain slave device 10 not selected as a display object of communication history, branching is performed to a NO side in step S310.

When a communication anomaly has occurred in all radio communications in a same period as the target radio communication (step S311: YES), the CPU 35 stores a value indicating that an estimated position of the communication failure inducer is in a periphery of the master device 20 in the third variable (step S312). When a communication anomaly has not occurred in all radio communications in the same period as the target radio communication (step S311: NO), the CPU 35 stores a value indicating that an estimated position of the communication failure inducer is between the target slave device and the master device 20 or in a periphery of the target slave device in the third variable (step S313).

The CPU 35 having finished the process of step S311 or S312 generates failure factor information including the device ID of the target slave device, the communication time and date of the target radio communication, and the first to third variable values, and stores the failure factor information on the RAM (step S314). Subsequently, the CPU 35 ends the current failure factor information generation process (the process shown in FIG. 8).

Returning to FIG. 6, the description of the failure factor estimation process will be continued.

The CPU 35 having finished the process of step S208 generates several hint messages indicating an object estimated to have induced a communication failure and an estimated position of the object based on the failure factor information on the RAM (step S209). Subsequently, the CPU 35 displays each generated hint message in the hint area 56 (step S210).

Hereinafter, the process of step S209 will be described in detail.

As already described, each piece of failure factor information generated during the process of step S208 includes a device ID, a communication time and date, and the first to third variable values. In addition, the first variable value in each piece of failure factor information indicates whether a communication failure inducer is a generation source of radio waves or an obstacle on a radio communication path. Furthermore, the third variable value indicates whether an estimated position of the communication failure inducer is in a periphery of the master device 20 or the communication failure inducer is between the target slave device and the master device 20 or in a periphery of the target slave device.

Therefore, for each piece of failure factor information, a hint message indicating an object estimated to have induced a communication failure and an estimated position of the object can be generated. However, configuring the process of step S209 as a process of generating a hint message for each piece of failure factor information normally causes a plurality of hint messages with almost the same contents to be displayed in the hint area 56. In addition, when a plurality of hint messages with almost the same contents are displayed in the hint area 56, it is difficult to comprehend a factor of a communication failure. Therefore, the failure factor estimation apparatus 30 is configured (programmed) so that the CPU 35 generates a hint message according to the following procedure during the process of step S209.

In step S209, the CPU 35 first groups pieces of failure factor information on the RAM according to combinations of device IDs and first to third variable values.

Moreover, the pieces of failure factor information are grouped by also using the second variable value in order to prevent pieces of failure factor information related to a radio communication in which a communication anomaly has not occurred continuously from being grouped into a single group. Specifically, when a hint range is wide, with respect to a radio communication from a certain slave device 10, there may be cases such as a communication anomaly occurring between a time and date a and a time and date b, the communication anomaly being temporarily resolved at a time and date c, and the communication anomaly reoccurring between a time and date d and a time and date e. When a combination of the device IDs and the first and third variable values causes failure factor information related to such slave devices 10 to be grouped together, failure factor information related to a radio communication performed between the time and date a and the time and date b and failure factor information related to a radio communication performed between the time and date d and the time and date e end up being grouped together. However, given that the communication anomaly has been temporarily resolved, the communication anomaly between the time and date a and the time and date b and the communication anomaly between the time and date d and the time and date e should be handled as different communication anomalies. In addition, by grouping the pieces of failure factor information by also using the second variable value (a value indicating a time and date of restoration of communication quality of a radio communication or a value indicating that a communication anomaly has occurred in all radio communications from the target slave device after the target radio communication), in cases such as that described above, failure factor information related to a radio communication performed between the time and date a and the time and date b and failure factor information related to a radio communication performed between the time and date d and the time and date e are divided into different groups. Furthermore, as a result, since the communication anomaly between the time and date a and the time and date b and the communication anomaly between the time and date d and the time and date e can now be handled as different communication anomalies, the pieces of failure factor information are grouped by also using the second variable value.

After finishing grouping the pieces of failure factor information on the RAM, with respect to each group constituted by a plurality of pieces of failure factor information, the CPU 35 respectively specifies an earliest communication time and date and a latest communication time and date in the pieces of failure factor information constituting the group as D1 and D2. In addition, with respect to each group constituted by a single piece of failure factor information, the CPU 35 specifies the communication time and date of the single piece of failure factor information in the group as D0.

Furthermore, with respect to a group constituted by a single piece of failure factor information, the CPU 35 generates a hint message such as those described below based on D0, the device ID, the first variable value, and the third variable value included in the failure factor information. Moreover, in the following description, a "radio wave generation source" and an "obstacle" respectively refer to a value indicating that a communication failure inducer is a generation source of radio waves and a value indicating that a communication failure inducer is an obstacle. In addition, "periphery of master device" and "periphery of slave device" respectively refer to a value indicating that an estimated position of the communication failure inducer is a periphery of the master device and a value indicating that an estimated position of the communication failure inducer is a periphery of the target slave device. Furthermore, a processing object group refers to a group selected as a generation object of a hint message, and a slave device X refers to the slave device 10 identified by a device ID included in each piece of failure factor information of the processing object group.

When the processing object group is constituted by a single piece of failure factor information and the first variable value and the third variable value in the failure factor information are respectively "obstacle" and "periphery of slave device", the CPU 35 generates a hint message reading "Wasn't there an AGV, a worker, or the like between the slave device X and the master device around D0?" In this case, as already described, D0 refers to a communication time and date included in the single piece of failure factor information constituting the processing object group.

In addition, when the processing object group is constituted by one piece of failure factor information and the first variable value and the third variable value in the failure factor information are respectively "radio wave generation source" and "periphery of slave device", the CPU 35 generates the following hint messages.

"Wasn't there another radio communication system arranged in the periphery of the slave device X operating around D0? Weren't there a large number of slave devices arranged in the periphery of the slave device X whose switches were pressed all at once around D0?"

In other words, the first variable value and the third variable value respectively represent a "radio wave generation source" and "periphery of slave device" when a collision has occurred only during radio communication from the slave device X. In this case, it is highly likely that a radio wave with a same or similar frequency as a frequency of a radio signal transmitted by each slave device 10 has been transmitted from an apparatus positioned in a periphery of the slave device X. However, the same phenomenon may also occur if switches of a large number of slave devices 10 arranged in the periphery of the slave device X were pressed all at once. Therefore, when the first variable value and the third variable value respectively represent a "radio wave generation source" and "periphery of slave device", a hint message for presenting the user with two factors is generated.

When the processing object group is constituted by one piece of failure factor information and the first variable value and the third variable value in the failure factor information are respectively "obstacle" and "periphery of master device", the CPU 35 generates a hint message reading "Wasn't there an AGV, a worker, or the like in the periphery of the master device at a position where radio communication with each slave device is obstructed around D0?"

In addition, when the processing object group is constituted by one piece of failure factor information and the first variable value and the third variable value in the failure factor information are respectively "radio wave generation source" and "periphery of master device", the CPU 35 generates the following hint messages.

"Wasn't there another radio communication system arranged in the periphery of the master device operating around D0? Weren't there a large number of slave devices arranged in the periphery of the master device whose switches were pressed all at once around D0?"

In other words, when the first variable value and the third variable value respectively represent a "radio wave generation source" and the "periphery of master device", the CPU 35 generates a hint message for presenting the user with two factors in a similar manner to a case where the first variable value and the third variable value respectively represent a "radio wave generation source" and the "periphery of slave device".

When the processing object group is constituted by a plurality of pieces of failure factor information, the CPU 35 determines whether or not "D2−D1" is equal to or longer than a prescribed time. In addition, when "D2−D1" is shorter than the prescribed time, a hint message such as that described below is generated based on the device ID, the first variable value, and the third variable value included in each piece of failure factor information in the processing object group.

"Wasn't there an AGV, a worker, or the like between the slave device X and the master device around D1 to D2?"

In other words, when the processing object group is constituted by a plurality of pieces of failure factor information and, at the same time, "D2−D1" is shorter than the prescribed time, the CPU 35 generates a hint message which only differs from the hint message generated when the processing object group is constituted by one piece of failure factor information in time and date information ("around D0" and "around D1 to D2").

On the other hand, when the processing object group is constituted by a plurality of pieces of failure factor information and, at the same time, "D2−D1" is equal to or longer than the prescribed time, the CPU 35 generates a hint message such as those described below.

"Wasn't there new equipment or the like between the slave device X and the master device obstructing radio communication between the slave device X and the master device around D1 to D2?"

"Wasn't there another radio communication system arranged in the periphery of the slave device X frequently operating around D1 to D2? Weren't there a large number of slave devices arranged in the periphery of the slave device X whose switches were continuously pressed all at once around D1 to D2?"

"Wasn't there new equipment or the like in the periphery of the master device obstructing radio communication with each slave device around D1 to D2?" "Wasn't there another radio communication system arranged in the periphery of the master device frequently operating around D1 to D2? Weren't there a large number of slave devices arranged in the periphery of the master device whose switches were continuously pressed all at once around D1 to D2?"

In other words, when the processing object group is constituted by a plurality of pieces of failure factor information and, at the same time, "D2–D1" is equal to or longer than the prescribed time, it is highly likely that the communication failure has not been induced by a temporary factor. Therefore, the failure factor estimation apparatus 30 is configured (programmed) so that the CPU 35 generates a hint message such as those described above during the process of step S209.

In step S209, the CPU 35 generates several hint messages according to the procedure described above. Subsequently, after displaying each generated hint message in the hint area 56 (step S210), the CPU 35 returns to step S205 to await various instruction operations to be performed.

In addition, when an end instruction operation is performed (step S206: YES), the CPU 35 saves the display condition information on the RAM in the storage unit 36 (step S211). In the current step S211, when the designated time range indicated by the display condition information on the RAM has been designated by an operation with respect to the display range input field 54, the CPU 35 changes the display condition information on the RAM to display condition information indicating that the designated time range is one hour before the start time and date of the process of step S201 and then saves the changed display condition information in the storage unit 36. Moreover, the process of step S211 is configured in this manner in order to cause a communication situation confirmation screen on which latest communication history is shown in the communication history display area 53 to be displayed on the display 32 when the user instructs execution of the failure factor estimation program 38 (the second program).

Subsequently, the CPU 35 having finished the process of step S211 ends the current failure factor information generation process.

As described above, each slave device 10 of the radio communication system according to the present embodiment repetitively transmits, a plurality of times, a radio signal with a prescribed frequency that includes a device ID of the slave device itself during radio communication (unidirectional radio communication) to the master device 20. In addition, the master device 20 generates communication situation information including a reception success rate and received signal strength of a radio signal during each radio communication. This communication situation information generated by the master device 20 is information which enables whether or not a radio wave collision has occurred to be determined from the reception success rate and which enables whether or not a drop in radio field strength due to an obstacle has occurred to be determined from the received signal strength. In addition, based on communication situation information generated by the master device 20 with respect to a plurality of radio communications including a processing-object radio communication, the failure factor estimation apparatus 30 of the radio communication system determines whether or not a communication failure in which the received signal strength is lower than prescribed strength and/or the reception success rate is lower than a prescribed rate has occurred during the processing-object radio communication, and in a case where the communication failure has occurred during the processing-object radio communication, generates and outputs (displays) a hint message indicating a failure inducer estimated to have induced the communication failure and an estimation result of a relative position of the failure inducer with respect to a transmission source slave device 10 of the processing-object radio communication and/or the master device 20. Therefore, a user of the radio communication system according to the present embodiment can promptly specify a factor having induced a communication failure based on the hint message output by the failure factor estimation apparatus 30. As a result, the user can promptly restore a radio communication system in which a communication failure has occurred to a normal state.

Second Embodiment

Hereinafter, a configuration and operations of a radio communication system according to a second embodiment of the present invention will be described with a focus on differences from the radio communication system according to the first embodiment described above. Note that, in the following description, a radio communication system according to an n-th (n=1 to 3) embodiment will also be described as an n-th radio communication system.

Figure 9:
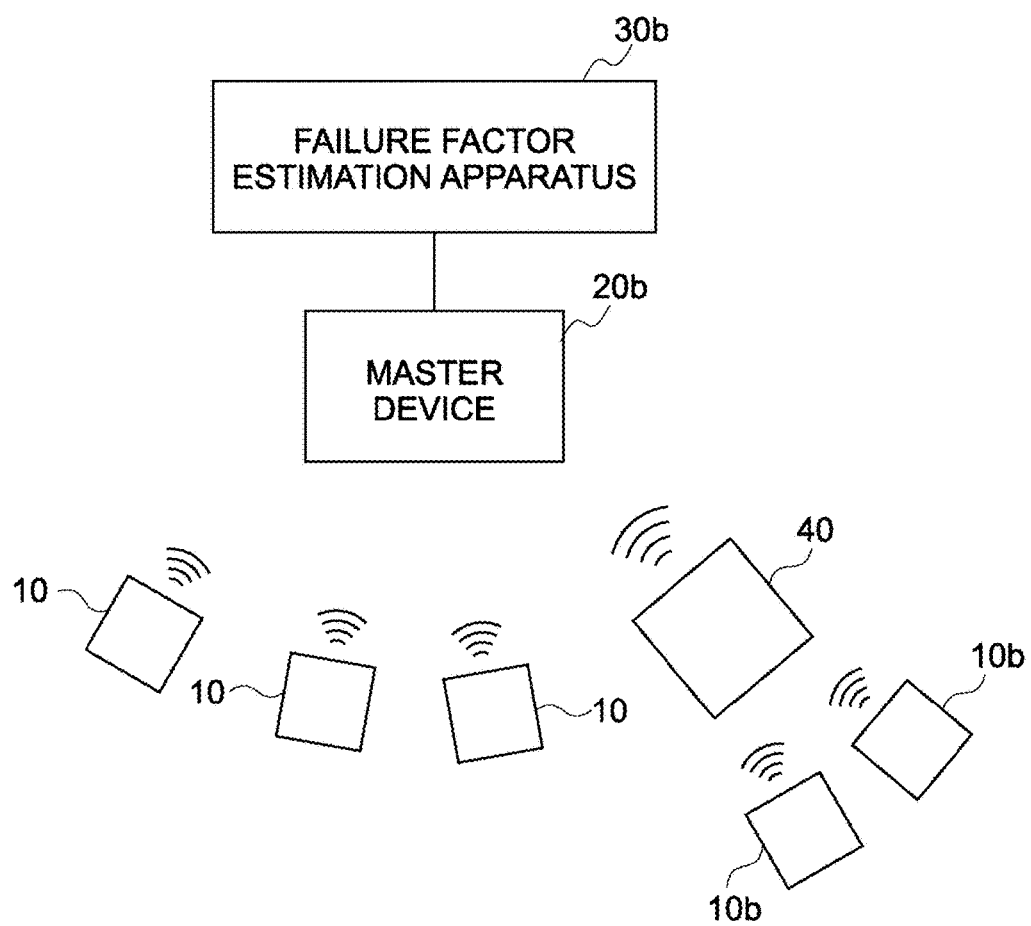
FIG. 9 is a schematic configuration diagram of a radio communication system according to a second embodiment of the present invention.

FIG. 9 shows a schematic configuration of second radio communication system (a radio communication system according to the second embodiment). As illustrated, the second radio communication system includes a plurality of slave devices 10, a plurality of slave devices 10b, a master device 20b, a failure factor estimation apparatus 30b, and one or more (in the diagram, one) repeaters 40.

Slave Device 10b

Each slave device 10b of the second radio communication system is an apparatus which, when there is control output information to be transmitted to the master device 20b, repetitively transmits a radio signal with a second prescribed frequency that includes the control output information and a device ID of the slave device itself N (≥2) number of times at a prescribed repetition period in a similar manner to the slave device 10. Moreover, each slave device 10b is arranged at a position separated from the master device 20b (a position from which information cannot be directly transmitted to the master device 20b by radio due to reduced signal strength). In addition, the second prescribed frequency (a frequency of a radio signal transmitted by the slave device 10b) may be the same as or may differ from the prescribed frequency (the frequency of a radio signal transmitted by the slave device 10) described earlier.

Repeater 40

The repeater 40 is basically an apparatus which relays a radio signal from each slave device 10b to the master device 20b. However, a function for generating communication situation information related to a radio communication from each slave device 10b and transmitting the generated communication situation information to the master device 20b has been added to the repeater 40.

Hereinafter, the repeater 40 will be described in greater detail.

Figure 10:
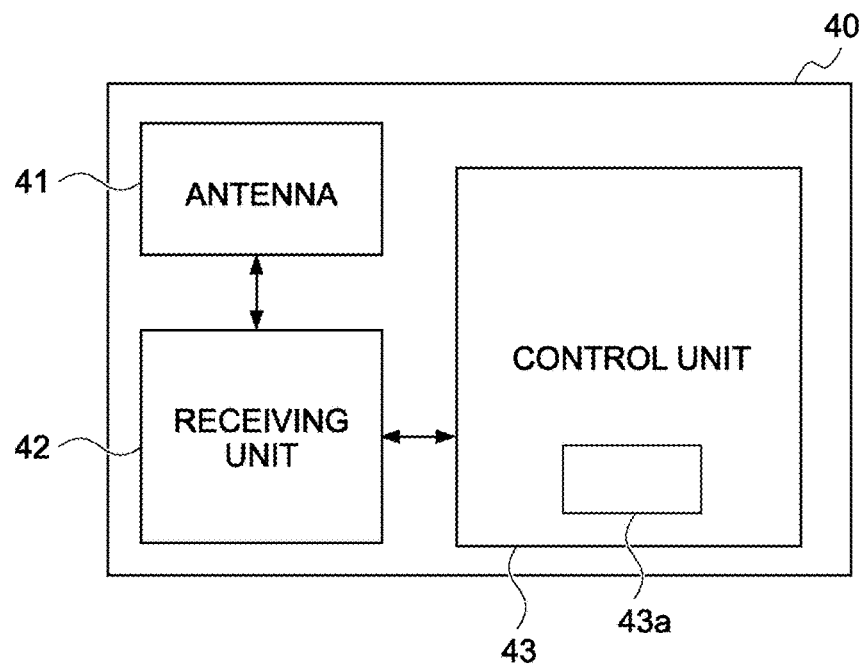
FIG. 10 is a schematic configuration diagram of a repeater used in the radio communication system according to the second embodiment.

FIG. 10 shows a schematic configuration of the repeater 40. As illustrated, the repeater 40 includes an antenna 41, a transmitting and receiving unit 42, and a control unit 43.

The transmitting and receiving unit 42 is a unit which performs: a process of converting a radio signal from each slave device 10b received by the antenna 41 into data and notifying the control unit 43 of the converted data; and a process of converting data of which transmission is instructed by the control unit 43 into a radio signal (details will be provided later) and transmitting the converted radio signal from the antenna 41. When a radio signal from each slave device 10b is received by the antenna 41, the transmitting and receiving unit 42 notifies the control unit 23 of received signal strength of the received radio signal together with a conversion result (a device ID and control output information) of the radio signal into data.

Figure 11:
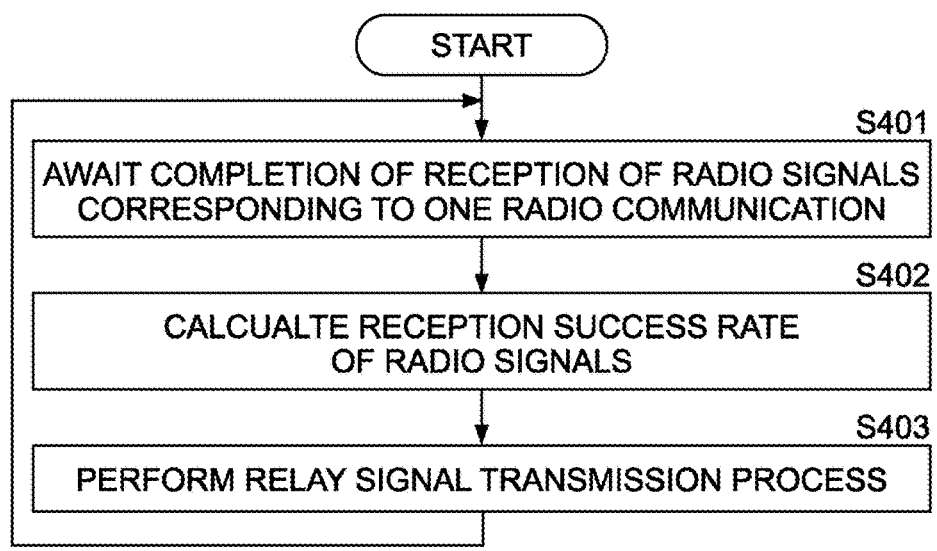
FIG. 11 is a flow chart of a relay process executed by a control unit of the repeater.

The control unit 43 is a unit constituted by a processor (a CPU or a microprocessor), a storage apparatus 43a (in the present embodiment, a ROM and a RAM), and the like. The storage apparatus 43a (ROM) stores a program created to be used by the repeater 40, and when the processor reads the program onto the RAM and executes the program, the control unit 43 functions as a unit which performs a relay process including a procedure shown in FIG. 11.

Specifically, normally, in step S401, the control unit 43 awaits (monitors) reception of radio signals corresponding to one radio communication to be completed. As already described, when there is control output information to be transmitted to the master device 20b, each slave device 10b repetitively transmits a radio signal which includes the device ID of the slave device itself and the control output information N-number of times at a prescribed repetition period. Therefore, in step S401, the control unit 43 determines whether or not reception of radio signals corresponding to one radio communication has been completed using information (device ID) from the transmitting and receiving unit 42 and the repetition period.

When the reception of radio signals corresponding to one radio communication has been completed, the control unit 43 calculates a reception success rate by dividing the number of radio signals received during the current radio communication by N (step S402). In the current step S402, the control unit 43 also performs a process of determining received signal strength to be used during a relay signal transmission process to be described later (a process of specifying a smallest value of the received signal strength of radio signals received during the current radio communication and the like).

Next, the control unit 43 performs a relay signal transmission process (step S403). The relay signal transmission process is a process of causing the transmitting and receiving unit 42 to transmit a relay signal that is a radio signal with a third prescribed frequency and which includes the following information.

A device ID of its own repeater 40

Information received from the slave device 10b in the current radio communication (a device ID and control output information in a received radio signal: hereinafter, also described as received information)

Communication situation information (a reception success rate, received signal strength, and a device ID and a communication time and date in a received radio signal) with respect to current radio communication In this case, the third prescribed frequency refers to a frequency which differs from both the prescribed frequency and the second prescribed frequency described earlier. Moreover, since the relay signal is configured as a signal including received information and communication situation information (a signal including two device IDs of the same slave device 10b) in order to simplify processes by the master device 20b during reception of the relay signal, the relay signal may alternatively be a signal including only one device ID of the slave device 10b.

The control unit 43 having finished the relay signal transmission process returns to step S401 and awaits (monitors) reception of the relay signal and reception of radio signals corresponding to one radio communication to be completed.

Master Device 20b

Hereinafter, a configuration and functions of the master device 20b will be described using FIG. 3.

The master device 20b is an apparatus with approximately the same configuration as the master device 20 (FIG. 3). However, the receiving unit 22 of the master device 20b also receives a radio signal with the third prescribed frequency (in other words, a relay signal from the repeater 40). In addition, the control unit 23 of the master device 20b is configured (programmed) to perform a repeater ID setting reception process and a relay signal process in addition to the slave device ID setting reception process and the display/output control process described earlier.

The slave device ID setting reception process by the control unit 23 of the master device 20b is the same process as the slave device ID setting reception process described earlier. However, during the slave device ID setting reception process by the control unit 23 of the master device 20b, the user sets a device ID of each slave device 10 or 10b arranged (or, to be arranged) in a vicinity of each management object #k (k=1 to M).

The repeater ID setting reception process is a process of receiving a setting of a device ID of each repeater 40. Hereinafter, a device ID of each repeater 40 will also be described as a repeater ID. In addition, a device ID of each slave device 10 or 10b will also be described as a slave device ID.

The repeater ID setting reception process is performed during the slave device ID setting reception process (in other words, at the start of operation of the radio communication system). Each repeater ID of which setting is received by the repeater ID setting reception process is stored in the storage apparatus 23a separately from correspondence relationship information (information indicating a correspondence relationship between each of a plurality of management object numbers k and one or more device IDs of the slave device 10 or the slave device 10b) generated by the setting of the slave device ID.

Figure 12:
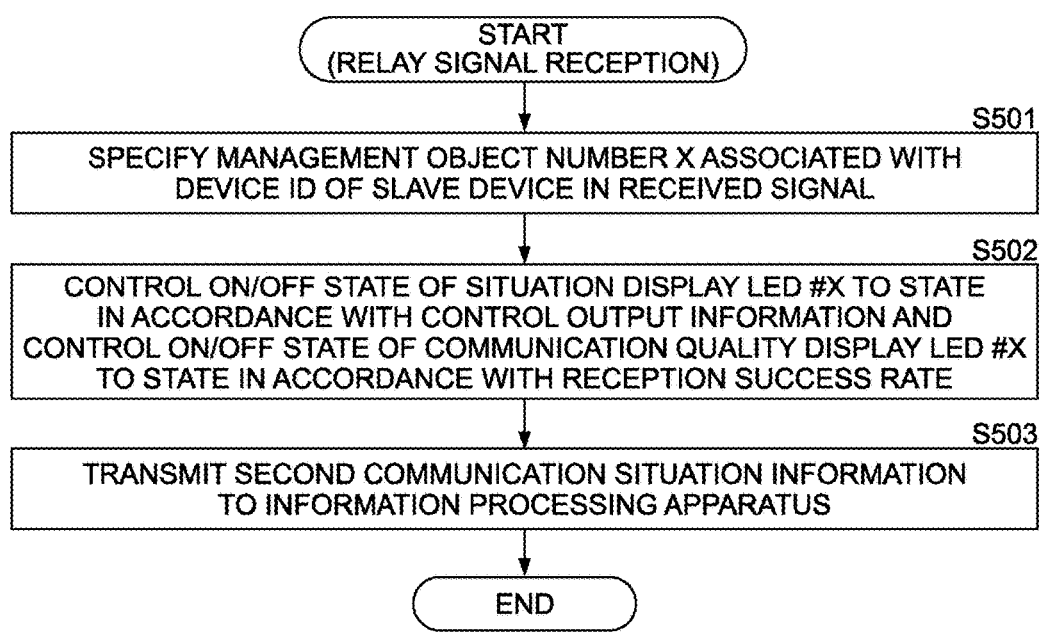
FIG. 12 is a flow chart of a relay signal process executed by a control unit of a master device of the radio communication system according to the second embodiment.

The relay signal process is a process including a procedure shown in FIG. 12 which is executed by the control unit 23 of the master device 20b for each reception of a relay signal.

Specifically, since a relay signal is received (a demodulation result of a relay signal is notified from the receiving unit 22), the control unit 23 having started the relay signal process first specifies a management object number X associated with a slave device ID (in this case, a device ID of the slave device 10b) in the received relay signal (step S501). More specifically, the control unit 23 performs a process of reading, from the correspondence relationship information, the management object number X associated with the slave device ID notified by the receiving unit 22.

In following step S502, the control unit 23 performs a similar process to the process of step S104 described earlier. Specifically, when the control output information in each currently-received relay signal is ON information, the control unit 23 controls a state of a communication quality display LED #X to an ON state (a lighted state). In addition, when the control output information is OFF information, the control unit 23 controls the state of the communication quality display LED #X to an OFF state (a turned-off state). Furthermore, when the reception success rate and the received signal strength in the currently-received relay signal are respectively equal to or higher than a prescribed rate and equal to or higher than prescribed strength, the control unit 23 controls the state of the communication quality display LED #X to the ON state, but if not, the control unit 23 controls the state of the communication quality display LED #X to the OFF state.

The control unit 23 having finished the process of step S502 transmits second communication situation information which combines the communication situation information included in the currently-received relay signal and a repeater ID to the failure factor estimation apparatus 30*b* via the communication interface 26 (step S503). Subsequently, the control unit 23 having finished the process of step S503 ends the relay signal process.

Failure Factor Estimation Apparatus 30*b*

The failure factor estimation apparatus 30*b* is a computer (refer to FIG. 5) in which a second failure factor estimation program is installed in place of the failure factor estimation program 38.

The second failure factor estimation program is a program that represents a modification of the failure factor estimation program 38. The CPU 35 in the failure factor estimation apparatus 30*b* in accordance with the second failure factor estimation program basically performs the same processes as those performed by the CPU 35 in the failure factor estimation apparatus 30.

However, the CPU 35 in the failure factor estimation apparatus 30*b* saves each piece of communication situation information and each piece of second communication situation information (communication situation information and device ID of the repeater 40) from the master device 20*b* in the storage unit 36. In addition, the CPU 35 causes the display 32 and the input device 33 to function as a user interface unit which enables the repeater 40 to display a communication situation to be designated by an operation of the input device 33. Furthermore, when the repeater 40 to display a communication situation is designated, based on each piece of second communication situation information including the device ID of the designated repeater 40, the CPU 35 displays a communication situation confirmation screen (refer to FIG. 7) which enables a communication situation between the repeater 40 and each slave device 10*b* and a hint message with respect to an occurring communication failure to be confirmed on the display 32. Moreover, the hint message to be displayed on the communication situation confirmation screen reads something like "Wasn't there an AGV, a worker, or the like between a slave device X and a repeater #Y around D0?"

As described above, when there is control output information to be transmitted to the master device 20, each slave device 10 or 10*b* of the radio communication system according to the present embodiment repetitively transmits, a plurality of times, a radio signal with a prescribed frequency that includes a device ID of the slave device itself and control output information. In addition, each repeater 40 of the radio communication system according to the present embodiment transmits information notified by a radio signal from each slave device 10*b* to the master device 20*b* and, at the same time, notifies the master device 20*b* of second communication situation information which includes a reception success rate and received signal strength of a radio signal from each slave device 10*b* and a repeater ID of the repeater 40 itself. Moreover, in addition to a same function as the master device 20, the master device 20*b* has a function of generating and outputting (displaying), based on second communication situation information notified from each repeater 40, a hint message indicating a failure inducer estimated to have induced a communication failure and an estimation result of a relative position of the failure inducer with respect to the slave device 10*b* and/or the repeater 40 for each repeater 40. Therefore, a user of the radio communication system according to the present embodiment can promptly specify a factor having induced a communication failure based on a hint message output by the failure factor estimation apparatus 30*b* even when the communication failure occurs during communication between the slave device 10*b* and the repeater 40.

Third Embodiment

Hereinafter, a configuration and operations of a radio communication system according to a third embodiment of the present invention will be described with a focus on differences from the radio communication system according to the first embodiment described earlier. As already defined, note that, in the following description, an n-th (n=1 to 3) radio communication system refers to a radio communication system according to an n-th embodiment.

The third radio communication system is a system which shares a same configuration as the first radio communication system (refer to FIGS. 1 to 3 and 5). However, the CPU 35 (FIG. 5) of the failure factor estimation apparatus 30 of the third radio communication system (hereinafter, described as a third failure factor estimation apparatus 30) is configured (programmed) to perform a third failure factor estimation process instead of the failure factor estimation process (FIGS. 6 and 8) described above.

The third failure factor estimation process is basically a process with the same contents as the failure factor estimation process. However, during execution of the third failure factor estimation process (during display of the communication situation confirmation screen), the CPU 35 executing the third failure factor estimation process causes the display 32 and the input device 33 to function as a user interface unit which enables the user to select an estimation mode of a failure factor from a normal mode and first to fourth modes.

The normal mode is a mode in which a factor of an occurring communication failure is estimated with a same group of communication situation information as the failure factor estimation process as a processing object. Moreover, as is apparent from the procedure of the failure factor estimation process described earlier, a same group of communication situation information as the failure factor estimation process refers to a group of communication situation information with respect to each radio communication performed within a designated time range from each slave device 10 considered a history display object slave device.

The first to fourth modes are estimation modes of a failure factor which have been added for the purpose of reducing a load on the CPU 35 during failure factor estimation or reducing the number of hint messages displayed in the hint area 56. The first to fourth modes are modes which use the number of past transmissions (details will be provided later) to estimate a failure factor. In addition, the CPU 35 of the third failure factor estimation apparatus 30 causes the display 32 and the input device 33 to function as a user interface unit which enables the number of past transmissions to be changed from a default value when the first to fourth modes are selected.

Hereinafter, operations of the CPU 35 in the third failure factor estimation apparatus 30 in the first to fourth modes will be described in sequence.

First Mode

When the first mode is designated (selected), the CPU 35 first retrieves communication situation information with best received signal strength among pieces of latest communication situation information corresponding to the number of past transmissions with respect to each slave device 10 considered a history display object slave device. Next, the CPU 35 retrieves communication situation information with worst received signal strength among communication situation information of which a communication time and date is later than the retrieved communication situation information. In this case, when the number of past transmissions is denoted by M, the pieces of latest communication situation information corresponding to the number of past transmissions refer to communication situation information with a latest communication time and date (a communication time and date nearest to the present time and date) to communication situation information with an M-th latest communication time and date. In addition, communication situation information with best received signal strength refers to communication situation information of which the received signal strength (RSSI) has a largest value, which is at least a propriety threshold set in advance (in the present embodiment, a same value as the prescribed strength described earlier). Communication situation information with worst received signal strength refers to communication situation information of which the received signal strength has a smallest value that is smaller than the propriety threshold.

When two pieces of communication situation information satisfying the conditions described above are retrieved, the CPU 35 performs a communication failure factor information generation process (FIG. 8) solely on, as a processing object, each piece of communication situation information of which a communication time and date are within a time range (hereinafter, described as a processing object range) having communication times and dates of the two retrieved pieces of communication situation information as boundaries. Subsequently, based on a processing result of each communication failure factor information generation process, the CPU 35 performs the same processes as steps S209 and S210 described earlier. Specifically, the CPU 35 performs a process of updating display contents of the hint area 56 based solely on pieces of communication situation information within the processing object range with respect to each slave device 10 considered a history display object slave device.

A processing procedure when two pieces of communication situation information satisfying the conditions described above are not retrieved is not particularly limited. For example, when two pieces of communication situation information satisfying the conditions described above are not retrieved, a message describing this fact may be displayed. Alternatively, when two pieces of communication situation information satisfying the conditions described above are not retrieved, a communication failure factor information generation process may be performed on each of the pieces of latest communication situation information corresponding to the number of past transmissions as a processing object, and display contents of the hint area 56 may be updated based on a result thereof.

Second Mode

When the second mode is designated, the CPU 35 first retrieves communication situation information with worst received signal strength among pieces of latest communication situation information corresponding to the number of past transmissions with respect to each slave device 10 considered a history display object slave device. Hereinafter, communication situation information retrieved by this process will be referred to as communication situation information of attention, and a slave device ID and a communication time and date in the communication situation information of attention will be respectively described as a slave device ID of attention and a communication time and date of attention.

The CPU 35 having retrieved the communication situation information of attention retrieves pieces of communication situation information with favorable received signal strength in a descending order of communication times and dates among pieces of communication situation information related to a radio communication from the slave device ID of attention of which a communication time and date are earlier than the communication time and date of attention. In this case, communication situation information with favorable received signal strength refers to communication situation information of which the received signal strength (RSSI) is equal to or higher than the propriety threshold. In addition, this retrieval process is a process which only targets pieces of latest communication situation information corresponding to the number of past transmissions and which ends when communication situation information with favorable received signal strength is retrieved.

When two pieces of communication situation information satisfying the conditions described above are retrieved, the CPU 35 performs a similar process as in the first mode described above. Specifically, the CPU 35 performs a communication failure factor information generation process solely on, as a processing object, each piece of communication situation information of which the communication time and date are within a processing object range (a time range) having communication times and dates of the two retrieved pieces of communication situation information as boundaries. Subsequently, based on a processing result of each communication failure factor information generation process, the CPU 35 updates display contents of the hint area 56 by performing the same processes as steps S209 and S210 described earlier.

A processing procedure when retrieval of communication situation information fails in the second mode is also not particularly limited. For example, when two pieces of communication situation information satisfying the conditions described above are not retrieved, a message describing this fact may be displayed. Alternatively, when two pieces of communication situation information satisfying the conditions described above are not retrieved, a communication failure factor information generation process may be performed on each of the pieces of latest communication situation information corresponding to the number of past transmissions as a processing object, and display contents of the hint area 56 may be updated based on a result thereof.

Third Mode

When the third mode is designated, the CPU 35 first retrieves communication situation information with worst received signal strength among pieces of latest communication situation information corresponding to the number of past transmissions with respect to each slave device 10 considered a history display object slave device. Next, the CPU 35 retrieves pieces of communication situation information with favorable received signal strength in an ascending order of communication times and dates among pieces of communication situation information of which a communication time and date is later than the retrieved communication situation information. Moreover, this retrieval process is a process which ends when communication situation information with favorable received signal strength is retrieved.

When two pieces of communication situation information satisfying the conditions described above are retrieved, in a similar manner to the first and second modes described earlier, the CPU 35 performs a communication failure factor information generation process solely on, as a processing object, each piece of communication situation information of which a communication time and date are within a processing object range having communication times and dates of the two retrieved pieces of communication situation information as boundaries. Subsequently, based on a processing result of each communication failure factor information generation process, the CPU 35 updates display contents of the hint area 56 by performing the same processes as steps S209 and S210 described earlier.

As a processing procedure when retrieval of communication situation information fails in the third mode, a procedure similar to those in the first and second modes can be adopted.

Fourth Mode

When the fourth mode is designated, the CPU 35 first retrieves communication situation information with best received signal strength among pieces of latest communication situation information corresponding to the number of past transmissions with respect to each slave device 10 considered a history display object slave device.

Next, the CPU 35 retrieves pieces of communication situation information with favorable received signal strength in an ascending order of communication times and dates among communication situation information of which a communication time and date is later than the retrieved communication situation information. This retrieval process is a process which ends when communication situation information with favorable received signal strength is retrieved.

When two pieces of communication situation information satisfying the conditions described above are retrieved, in a similar manner to the first to third modes described above, the CPU 35 performs a communication failure factor information generation process solely on, as a processing object, each piece of communication situation information of which a communication time and date are within a processing object range having communication times and dates of the two retrieved pieces of communication situation information as boundaries. Subsequently, based on a processing result of each communication failure factor information generation process, the CPU 35 updates display contents of the hint area 56 by performing the same processes as steps S209 and S210 described earlier.

As a processing procedure when retrieval of communication situation information fails in the fourth mode, a procedure similar to those in the first to third modes can be adopted.

Hereinafter, the first to fourth modes will be described in greater detail using an example of a case where the number of past transmissions is eight.

Figure 13:
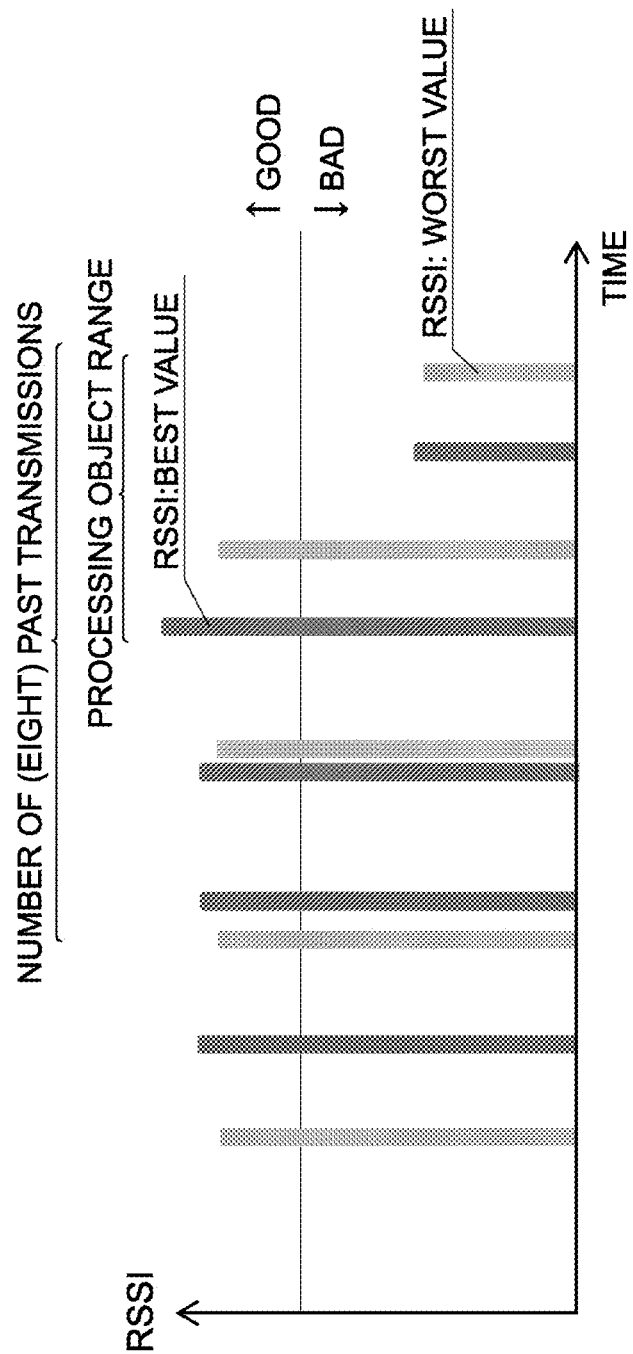
FIG. 13 is an explanatory diagram of a first mode of a radio communication system according to a third embodiment.

A case will now be considered in which radio signal strength (RSSI) of each recent radio communication from two history display object slave devices changes as shown in FIG. 13. In this case, in the first mode, as shown in FIG. 13, communication situation information with best received signal strength (RSSI) is retrieved from communication situation information related to each history display object slave device corresponding to the number of past transmissions (eight latest transmissions). Furthermore, communication situation information with worst received signal strength is retrieved from pieces of communication situation information of which a communication time and date is later than the retrieved communication situation information.

Next, a communication failure factor information generation process is performed solely on, as a processing object, each piece of communication situation information of which the communication time and date are within a processing object range having communication times and dates of the two retrieved pieces of communication situation information as boundaries. Subsequently, based on a processing result of each communication failure factor information generation process, display contents of the hint area 56 are updated.

Figure 14:
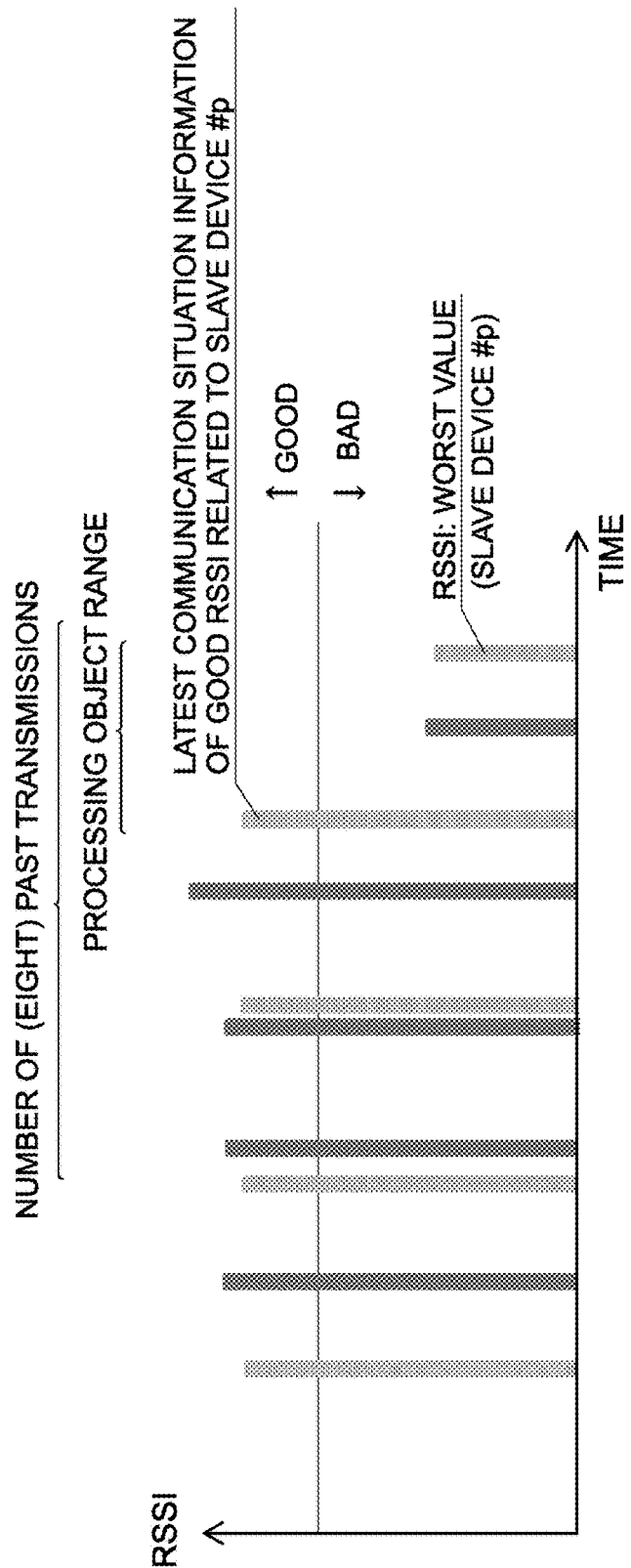
FIG. 14 is an explanatory diagram of a second mode of the radio communication system according to the third embodiment.

In addition, when radio signal strength in each recent radio communication from the two history display object slave devices changes as shown in FIG. 13, in the second mode, communication situation information with worst received signal strength is retrieved from communication situation information related to each history display object slave device corresponding to the number of past transmissions as shown in FIG. 14.

Furthermore, from pieces of communication situation information of which a communication time and date are earlier than in the retrieved communication situation information, communication situation information of which received signal strength is equal to or higher than the propriety threshold in a similar manner to the communication situation information with the retrieved slave device ID is retrieved in a descending order of communication times and dates. In other words, as schematically shown in FIG. 14, when the communication situation information with the worst received signal strength is related to a radio communication from a slave device #p, communication situation information is retrieved that is related to a radio communication from the slave device #p of which the received signal strength is favorable and which has been performed immediately before the received signal strength attained a worst value.

Subsequently, after a communication failure factor information generation process (FIG. 8) is performed only on, as processing object information, each piece of communication situation information of which the communication time and date are between communication times and dates of the two retrieved pieces of communication situation information, the display contents of the hint area 56 are updated based on a processing result of each communication failure factor information generation process.

Figure 15:
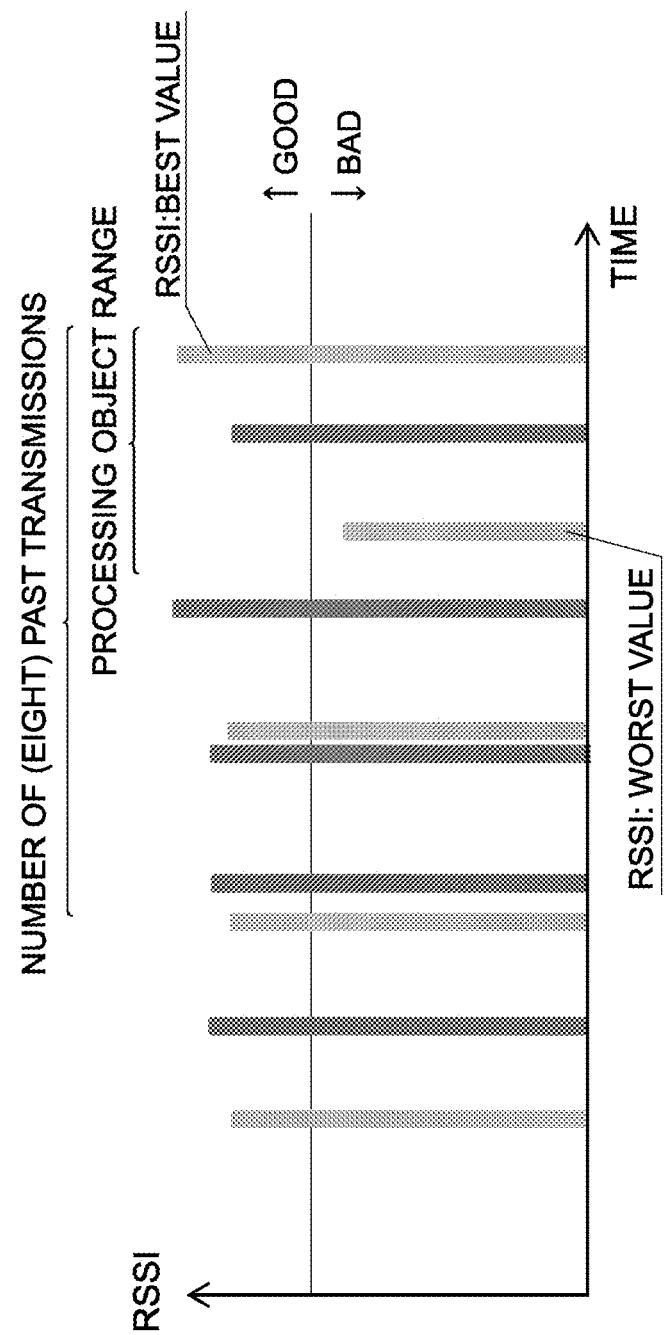
FIG. 15 is an explanatory diagram of a third mode of the radio communication system according to the third embodiment.

In addition, when radio signal strength in each recent radio communication from the two history display object slave devices changes as shown in FIG. 15, in the third mode, communication situation information with worst received signal strength is retrieved from communication situation information related to each history display object slave device corresponding to the number of past transmissions as shown in FIG. 15. Furthermore, communication situation information with best received signal strength is retrieved from pieces of communication situation information of which a communication time and date is later than the retrieved communication situation information.

Subsequently, after a communication failure factor information generation process is performed only on, as processing object information of which each piece of communication situation information the communication time and date are between communication times and dates of the two retrieved pieces of communication situation information, the display contents of the hint area 56 are updated based on a processing result of each communication failure factor information generation process.

In addition, when radio signal strength (RSSI) in each recent radio communication from the two history display object slave devices changes as shown in FIG. 14, in the fourth mode, communication situation information with worst received signal strength is retrieved from communication situation information related to each history display object slave device corresponding to the number of past transmissions as shown in FIG. 15. Furthermore, communication situation information related to a radio communication in which the received signal strength had changed to favorable received signal strength for the first time is retrieved from pieces of communication situation information of which a communication time and date is later than the retrieved communication situation information. Subsequently, after a communication failure factor information generation process is performed only on, as processing object information, each piece of communication situation information of which the communication time and date are between communication times and dates of the two retrieved pieces of communication situation information, the display contents of the hint area 56 are updated based on a processing result of each communication failure factor information generation process.

As described above, the failure factor estimation apparatus 30 of the radio communication system according to the present embodiment is capable of estimating a failure factor in first to fourth modes. In addition, the first to fourth modes are configured as modes in which the number of pieces of communication situation information to be processing objects of a failure factor information generation process is smaller than in the normal mode. Therefore, with the radio communication system according to the present embodiment, a load on the CPU 35 during failure factor estimation can be reduced and the number of hint messages displayed in the hint area 56 can be prevented from increasing excessively.

Modifications

The radio communication systems according to the embodiments described above can be modified in various ways. For example, a hint message need only be information directly or indirectly indicating a failure inducer estimated to have induced a communication failure and an estimation result of a relative position of the failure inducer with respect to a transmission/reception device of a processing-object radio communication (the slave device 10 and/or the master device 20, or the slave device 10b and/or the repeater 40). Therefore, the failure factor estimation apparatuses 30 and 30b according to the respective embodiments may be modified into an apparatus which outputs (displays) a hint message that differs from those described earlier.

In addition, received signal strength decreases even when a distance between the slave device 10 and the master device 20 or a distance between the slave device 10b and the repeater 40 increase. Therefore, the failure factor estimation apparatuses 30 and 30b according to the respective embodiments may be modified into an apparatus which also outputs a message to the effect that the distance between the slave device 10 and the master device 20 or the distance between the slave device 10b and the repeater 40 has increased when outputting a hint message suggesting the presence of an obstacle.

In addition, the failure factor estimation apparatuses 30 and 30b may be modified into an apparatus which transmits a hint message to a mobile terminal or the like of the user or an apparatus which outputs a hint message by sound. Furthermore, the master devices 20 and 20b may be configured so as to also operate as the failure factor estimation apparatuses 30 and 30b. Moreover, having the master devices 20 and 20b also operate as the failure factor estimation apparatuses 30 and 30b can be realized by, for example, adding a function as a web server to the master devices 20 and 20b.

The first to fourth modes of the failure factor estimation apparatus 30b may be modified into modes in which communication situation information with smallest received signal strength is retrieved in place of communication situation information with worst received signal strength. In addition, the respective modes may be modified into modes in which communication situation information with largest received signal strength is retrieved in place of communication situation information with best received signal strength.

Moreover, it is obvious that the slave devices 10 and 10b and the master device 20 may be modified into apparatuses which differ from those described above in original functions thereof, specific procedures of the respective processes executed by the failure factor estimation apparatuses 30 and 30b may differ from those described above, and the like.

What is claimed is:

1. A radio communication system, which comprises a plurality of slave devices, a master device, and a failure factor estimation apparatus and in which a unidirectional radio communication from each slave device of the plurality of slave devices to the master device is performed, wherein
each slave device of the plurality of slave devices comprises
a radio communication circuit, which repetitively transmits, a plurality of times, a radio signal with a prescribed frequency that comprises device identification information of the respective slave device during a radio communication with the master device,
the master device comprises:
a specifying circuit, which specifies, each time the radio signal of the prescribed frequency is received, the device identification information comprised in the received radio signal and reception strength of the radio signal; and
an information generating circuit, which generates, based on a specification result by the specifying circuit, for each radio communication, communication situation information indicating a transmission source device of the radio communication, a reception success rate and a received signal strength of the radio signal during the radio communication, and a time and date at which the radio communication has been performed, and
the failure factor estimation apparatus comprises:
a retention circuit, which retains each piece of the communication situation information generated by the information generating circuit of the master device; and
a failure factor estimating circuit, which, based on the communication situation information with respect to a processing-object radio communication retained in the retention circuit, determines whether or not a communication failure in which the received signal strength is lower than at least one of a prescribed strength and the reception success rate is lower than a prescribed rate has occurred during the processing-object radio communication, and in a case where the communication failure has occurred during the processing-object radio communication, generates and outputs failure factor presentation information indicating a failure inducer estimated to have induced the communication failure and an estimation result of a relative position of the failure inducer with respect to the transmission source device of at least one of the processing-object radio communication and the master device by using the communication situation information with respect to one or more radio communications other than the processing-object radio communication, which are retained in the retention circuit.

2. The radio communication system according to claim 1, wherein
the failure factor estimation apparatus further comprises an accepting circuit, which accepts a time range set by a user as a processing-object time range, and
the failure factor estimating circuit of the failure factor estimation apparatus handles each radio communication performed within the processing-object time range accepted by an accepting means as the processing-object radio communication.

3. The radio communication system according to claim 1, wherein
the failure factor estimation apparatus further comprises:
a second specifying circuit, which specifies, based on the communication situation information with respect to a set number of recently performed radio communications by one or more slave devices of the plurality of slave devices designated by a user, an estimation object time range to be an object of estimation of a failure factor, out of the set number of recently performed radio communications, and
in response to the estimation object time range being specified by the second specifying circuit, the failure factor estimating circuit of the failure factor estimation apparatus handles each radio communication performed within the estimation object time range by the one or more slave devices of the plurality of slave devices designated by the user as the processing-object radio communication.

4. The radio communication system according to claim 3, wherein
based on the communication situation information with respect to the set number of recently performed radio communications by the one or more slave devices of the plurality of slave devices, the second specifying circuit of the failure factor estimation apparatus retrieves, from the one or more radio communications, the radio communication with a highest received signal strength and the radio communication with a lowest received signal strength and specifies as the estimation object time range a time range having the time and date at which each retrieved radio communication has been performed as a boundary.

5. The radio communication system according to claim 3, wherein
based on the communication situation information with respect to the set number of recently performed radio communications by the one or more slave devices of the plurality of slave devices, the second specifying circuit of the failure factor estimation apparatus retrieves a lowest strength radio communication with a lowest received signal strength and a highest strength radio communication with a highest received signal strength performed by a slave device having performed the lowest strength radio communication among the one or more radio communications, and specifies as the estimation object time range a time range having the time and date at which the retrieved highest strength radio communication has been performed and the time and date at which the retrieved lowest strength radio communication has been performed as boundaries.

6. The radio communication system according to claim 1, wherein
the failure factor estimating circuit of the failure factor estimation apparatus determines whether or not the communication failure has occurred with respect to each radio communication performed within a prescribed time range comprising a time at which the processing-object radio communication has been performed, and based on a determination result with respect to each radio communication, estimates the relative position of the failure inducer with respect to the transmission source device of at least one of the processing-object radio communication and the master device.

7. The radio communication system according to claim 1, wherein
the failure factor estimating circuit of the failure factor estimation apparatus:
generates, in a case where a first communication failure in which the received signal strength is lower than the prescribed strength and the reception success rate is equal to or higher than the prescribed rate has occurred during the processing-object radio communication, first information indicating that the failure inducer is an obstacle on a communication path and indicating an estimation result of a relative position of the obstacle with respect to the transmission source device of at least one of the processing-object radio communication and the master device as the failure factor presentation information; and
generates, in a case where a second communication failure in which the received signal strength is equal to or higher than the prescribed strength and the reception success rate is lower than the prescribed rate has occurred during the processing-object radio communication, second information indicating that the failure inducer is a generation source of a radio wave and indicating an estimation result of a relative position of the generation source with respect to the transmission source device of at least one of the processing-object radio communication and the master device as the failure factor presentation information.

8. The radio communication system according to claim 7, wherein
the failure factor estimating circuit of the failure factor estimation apparatus generates the first information as the failure factor presentation information in response to a third communication failure in which the received signal strength being lower than the prescribed strength and the reception success rate is lower than the prescribed rate has occurred during the processing-object radio communication.

9. The radio communication system according to claim 1, wherein
the failure factor estimating circuit of the failure factor estimation apparatus generates and outputs the failure factor presentation information indicating the estimation result of the relative position of the failure inducer with respect to the transmission source device of at least one of the processing-object radio communication and the master device and a fact that an interval between the transmission source device of the processing-object radio communication and the master device has increased.

10. The radio communication system according to claim 1, further comprising:

a plurality of second slave devices, each second slave device of which, in response to transmitting information to the master device, repetitively transmits, a plurality of times, a radio signal with a second prescribed frequency that comprises transmission information to be transmitted to the master device and the device identification information of the respective second slave device; and a repeater, which receives the radio signal with the second prescribed frequency and, which notifies, with the radio signal, the master device of the transmission information and the device identification information comprised in a received radio signal together with device identification information of the repeater itself, wherein the repeater comprises:

a second specifying circuit, which specifies, each time the radio signal with the second prescribed frequency is received, the device identification information comprised in the received radio signal and the reception strength of the radio signal; and a second information generating circuit, which generates, based on a specification result by the second specifying circuit, for each radio communication, second communication situation information indicating the transmission source device of the radio communication, the reception success rate and the received signal strength of the radio signal during the radio communication, and the time and date at which the radio communication has been performed, and the failure factor estimation apparatus further comprises:

a second retention circuit, which retains each piece of the second communication situation information generated by the second information generating circuit of the repeater; and a second failure factor estimating circuit, which, based on the second communication situation information with respect to a second processing-object radio communication retained in the second retention circuit, determines whether or not the communication failure has occurred during the second processing-object radio communication, and in a case where the communication failure has occurred during the second processing-object radio communication, generates and outputs second failure factor presentation information indicating a second failure inducer estimated to have induced the communication failure and a second estimation result of a second relative position of the second failure inducer with respect to a second transmission source device of at least one of the second processing-object radio communication and the repeater by using the second communication situation information with respect to the one or more radio communications other than the second processing-object radio communication, which are retained in the second retention circuit.

11. A non-transitory computer-readable storage medium storing a failure factor estimation program, which, in response to being read and executed by an information processing apparatus, causes the information processing apparatus to operate as the failure factor estimation apparatus according to claim 1.

* * * * *